(12) United States Patent
Sakata et al.

(10) Patent No.: US 9,164,880 B2
(45) Date of Patent: Oct. 20, 2015

(54) METHOD AND APPARATUS FOR OFFLOADING STORAGE WORKLOAD

(71) Applicant: Hitachi, Ltd., Chiyoda-ku, Tokyo (JP)

(72) Inventors: Masayuki Sakata, Kirkland, WA (US); Akio Nakajima, Santa Clara, CA (US); Akira Deguchi, Santa Clara, CA (US)

(73) Assignee: HITACHI, LTD., Tokyo (JP)

( * ) Notice: Subject to any disclaimer, the term of this patent is extended or adjusted under 35 U.S.C. 154(b) by 339 days.

(21) Appl. No.: 13/657,946

(22) Filed: Oct. 23, 2012

(65) Prior Publication Data

US 2014/0115277 A1 Apr. 24, 2014

(51) Int. Cl.
*G06F 12/00* (2006.01)

(52) U.S. Cl.
CPC ...................................... *G06F 12/00* (2013.01)

(58) Field of Classification Search
None
See application file for complete search history.

(56) References Cited

U.S. PATENT DOCUMENTS

| | | | |
|---|---|---|---|
| 5,860,137 A * | 1/1999 | Raz et al. ...................... | 711/202 |
| 6,832,272 B2 * | 12/2004 | Hirakawa et al. ............... | 710/36 |
| 7,962,706 B2 | 6/2011 | Davis | |
| 2003/0188085 A1 * | 10/2003 | Arakawa et al. .............. | 711/100 |
| 2003/0212862 A1 * | 11/2003 | James ........................... | 711/115 |
| 2005/0144384 A1 * | 6/2005 | Eguchi et al. ................. | 711/114 |
| 2005/0283545 A1 * | 12/2005 | Zur et al. ......................... | 710/36 |
| 2006/0168394 A1 * | 7/2006 | Nakatsuka et al. ............ | 711/112 |
| 2007/0174536 A1 * | 7/2007 | Nakagawa et al. ................ | 711/2 |
| 2008/0052541 A1 * | 2/2008 | Ginter et al. ................... | 713/194 |
| 2008/0209101 A1 * | 8/2008 | Kanai ............................ | 711/100 |
| 2009/0063528 A1 | 3/2009 | Yueh | |
| 2009/0063795 A1 | 3/2009 | Yueh | |
| 2009/0144496 A1 * | 6/2009 | Kawaguchi .................... | 711/114 |
| 2011/0022812 A1 * | 1/2011 | Van Der Linden et al. ... | 711/163 |

OTHER PUBLICATIONS

Hung et. al. "Executing mobile applications on the cloud: Framework and issues" 2011 Elsevier Ltd.*

* cited by examiner

*Primary Examiner* — Yaima Rigol
*Assistant Examiner* — Tasnima Matin
(74) *Attorney, Agent, or Firm* — Mattingly & Malur, PC

(57) ABSTRACT

Exemplary embodiments provide a technique to offload storage workload. In one aspect, a computer comprises: a memory; and a controller operable to manage a relationship among port information of an initiator port, information of a logical volume storing data from the initiator port, and port information of a target port to be used for storing data from the initiator port to the logical volume, and to cause another computer to process a storage function of a storage system including the logical volume and the target port by creating a virtual machine for executing the storage function and by configuring the relationship on said another computer, said another computer sending the data to the logical volume of the storage system after executing the storage function. In specific embodiments, by executing the storage function on said another computer, the workload of executing the storage function on the storage system is eliminated.

20 Claims, 22 Drawing Sheets

Fig. 9 — Server Information Table (402-04)

| Host# | Processor | Memory | Processor Usage % | Memory Usage % |
|---|---|---|---|---|
| Host_A | 2 CPUs x 3 GHz | 64GB | 50 | 50 |
| Host_B | 2 CPUs x 3 GHz | 128GB | 10 | 10 |
| Host_C | 2 CPUs x 3 GHz | 64GB | 30 | 30 |

Fig. 10 — Storage Controller Information Table (402-05)

| Controller# | Processor | Memory | CPU Usage % | Memory Usage % | IOPS |
|---|---|---|---|---|---|
| Controller A | 2 CPUs x 3 GHz | 32GB | 50 | 50 | 5000 |

Fig.19

Logical Volume Management Table (112-06)

| WWPN | LUN | VOL # |
|---|---|---|
| WWPN_1 | 0 | 0 |
| WWPN_2 | 1 | 0 |
| WWPN_3 | 0 | 0 |

Fig.20

Virtual Volume Management Table (302-04-04)

| WWPN | LUN | VLU # | Target WWPN | Target LUN |
|---|---|---|---|---|
| WWPN_2 | 1 | 1 | WWPN_3 | 0 |

METHOD AND APPARATUS FOR OFFLOADING STORAGE WORKLOAD

BACKGROUND OF THE INVENTION

The present invention relates generally to storage systems and, more particularly, to reducing workload in a storage system.

The amount of digital data is growing rapidly. As a result, a storage subsystem is required to provide more storage capacity. To utilize storage resources better, a storage subsystem provides data reduction features such as compression and deduplication. These features, however, consume more computing resources such as processor and memory of storage subsystem. To improve data reduction workload, specialized hardware for processing such as compression and deduplication is provided. This kind of hardware acts as the gateway between server and storage. For example, US2009/0063528 discloses a method for de-duplicating redundant data in memory, storage, or both, comprising: providing a virtualization layer on a computer architecture comprising memory for temporarily storing data, and storage for persistently storing data.

The specialized hardware approach is difficult to expand capacity according to the usage of data store, I/O, and processor/memory. Also, it is difficult to migrate from running process on the storage subsystem without disrupting existing connection between host and storage. US2009/0063528 does not show how to migrate from running process on the storage subsystem without disrupting existing connection between host and storage.

BRIEF SUMMARY OF THE INVENTION

Exemplary embodiments of the invention provide a technique to offload storage workload. It involves creating the storage controller as a VM (virtual machine) on a low usage server, configuring a virtual LU (logical unit) and virtual FC (Fibre Channel) port which has the same WWPN (World Wide Port Name) with the original FC port of the storage subsystem, copying processing control tables related to the LU and FC port, and switching the storage I/O (Input/Output) path. This invention can be used for improving server and storage usage in the converged platform environment. This invention can also be used for reducing storage workload in the cloud environment.

In accordance with an aspect of the present invention, a computer comprises: a memory; and a controller operable to manage a relationship among port information of an initiator port, information of a logical volume storing data from the initiator port, and port information of a target port to be used for storing data from the initiator port to the logical volume, and to cause another computer to process a storage function of a storage system including the logical volume and the target port by creating a virtual machine for executing the storage function and by configuring the relationship on said another computer, said another computer sending the data to the logical volume of the storage system after executing the storage function.

In some embodiments, by executing the storage function on said another computer, the workload of executing the storage function on the storage system is eliminated. The storage function is one of compression or de-duplication. Configuring the relationship on said another computer comprises creating a virtual logical volume on the virtual machine and associating the virtual logical volume on the virtual machine on said another computer with the logical volume in the storage system. The controller is operable to configure a logical connection between said another computer and the storage system. The controller is operable to configure a logical connection between said another computer as a second host computer and a first host computer which includes the initiator port, in order to form a new logical connection between the first host computer and the storage system via the second host computer, and the controller is operable to terminate a logical connection between the first host computer and the storage system that does not go through the second host computer and that was formed prior to causing the second host computer to process the storage function of the storage system.

In specific embodiments, the controller is operable to select said another computer, from a plurality of other computers, which has lowest usage of its own computer resources. Prior to causing said another computer to process the storage function of the storage system, the controller is operable to configure multiple logical connections between a first host computer which includes the initiator port and the storage system, the multiple logical connections including a primary logical connection and a secondary logical connection; and, after causing said another computer to process the storage function of the storage system, the controller is operable to terminate the secondary logical connection between the first host computer and the storage system, configure a logical connection between said another computer and the storage system and a logical connection between said another computer and the first host computer to form a new logical connection between the first host computer and the storage system via said another computer, change the primary logical connection to a new secondary logical connection, and change the new logical connection to a new primary logical connection. The controller is operable to specify one of a write through policy or a write back policy for write operation in said another computer with respect to sending the data to the logical volume in the storage system.

In accordance with another aspect of the invention, a system comprises: a storage system including a logical volume and a target port; and a first computer including a memory and a controller. The controller is operable to manage a relationship among port information of an initiator port, information of the logical volume storing data from the initiator port, and port information of the target port to be used for storing data from the initiator port to the logical volume, and to cause a second computer to process a storage function of the storage system by creating a virtual machine for executing the storage function and by configuring the relationship on the second computer, the second computer sending the data to the logical volume of the storage system after executing the storage function.

Another aspect of this invention is directed to a computer-readable storage medium storing a plurality of instructions for controlling a data processor to manage data storage. The plurality of instructions comprise: instructions that cause the data processor to manage a relationship among port information of an initiator port, information of a logical volume storing data from the initiator port, and port information of a target port to be used for storing data from the initiator port to the logical volume; and instructions that cause the data processor to cause another computer to process a storage function of a storage system including the logical volume and the target port by creating a virtual machine for executing the storage function and by configuring the relationship on said another computer, said another computer sending the data to the logical volume of the storage system after executing the storage function.

In some embodiments, the plurality of instructions further comprise: instructions that cause the data processor to configure a logical connection between said another computer and the storage system; instructions that cause the data processor to configure a logical connection between said another computer as a second host computer and a first host computer which includes the initiator port, in order to form a new logical connection between the first host computer and the storage system via the second host computer; and instructions that cause the data processor to terminate a logical connection between the first host computer and the storage system that does not go through the second host computer and that was formed prior to causing the second host computer to process the storage function of the storage system. The plurality of instructions further comprise instructions that cause the data processor to select said another computer, from a plurality of other computers, which has lowest usage of its own computer resources.

These and other features and advantages of the present invention will become apparent to those of ordinary skill in the art in view of the following detailed description of the specific embodiments.

BRIEF DESCRIPTION OF THE DRAWINGS

FIG. 9 shows an example of the server information table.

FIG. 10 shows an example of the storage controller information table.

FIGS. 11a, 11b, and 11c show the first status, second status, and third status of the offloading process, respectively.

FIGS. 15a, 15b, and 15c show the first status, second status, and third status of the offloading process, respectively.

FIGS. 17a, 17b, and 17c show the first status, second status, and third status of the offloading process, respectively.

FIG. 19 shows a logical volume management table that associates the target volume with the target port.

FIG. 20 shows a virtual volume management that associates the created target port and the virtual target volume and the target volume.

DETAILED DESCRIPTION OF THE INVENTION

Figure 1:
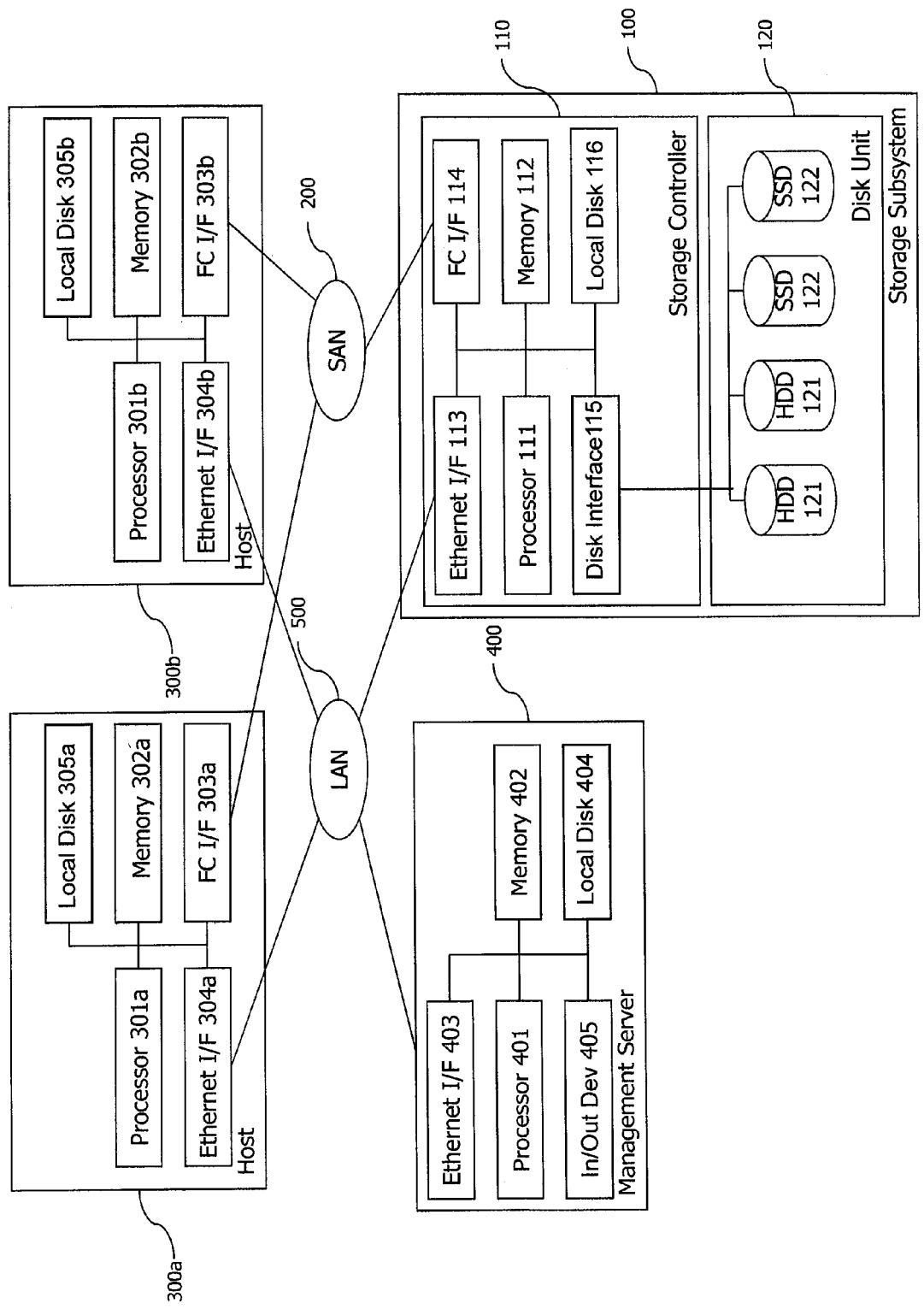
FIG. 1 illustrates an example of a hardware configuration of a system in which the method and apparatus of the invention may be applied.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium including non-transient medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for offloading storage workload.

Embodiment 1: Storage Compression Process Offloading to Low Usage Server

The first embodiment discloses how to offload storage compression process to a low usage server (host) while volume is used.

FIG. 1 illustrates an example of a hardware configuration of a system in which the method and apparatus of the invention may be applied. It includes Storage Subsystem 100, SAN (Storage Area Network) 200, Host Computer 300, Management Server 400, and Local Area Network (LAN) 500. Storage Subsystem 100 includes Storage Controller 110 and Disk Unit 120. Storage Controller performs disk I/O functionality with Host Computer 300 using Fibre Channel (FC) Protocol via SAN 200. Disk Unit 120 has plural storage devices such as Hard Disk Drive (HDD) and/or Solid State Drive (SSD). Storage Controller 110 has Processor 111, Memory 112, Ethernet Interface (Ethernet I/F) 113, FC Interface (FC I/F) 114, Disk Interface 115, and Local Disk 116. Storage Controller 110 combines Disk Unit 120 and configures RAID (Redundant Arrays of Inexpensive Disks), and then provides Volume (LU: Logical Unit) to Host Computer 300. These functions are executed by application programs shown in FIG. 2 and FIG. 5 (Logical Volume I/O Control, Physical Disk Control, and so on). Ethernet I/F 113 is an interface to LAN 500. FC I/F 114 is an interface to SAN 200. Disk Interface 115 is an interface to Disk Unit 120.

Host Computer 300 has Processor 301, Memory 302, FC Interface (FC I/F) 303, Ethernet Interface (Ethernet I/F) 304, and Local Disk 305. Ethernet I/F 304 is an interface to LAN 500. FC I/F 304 is an interface to SAN 200. FIG. 1 shows two host computers 300a, 300b. Host Computer 300 can be not only physical host but also virtual host such as virtual machine. Management Server 400 has Processor 401, Memory 402, Ethernet Interface (Ethernet I/F) 403, Local Disk 404, and Input/Output Device 405. Ethernet I/F 403 is an interface to LAN 500. Input/Output Device 405 is a user interface such as monitor, keyboard, and mouse which the system administrator uses.

FC I/F 114 of Storage Controller 110 and FC I/F 303 of Host 300 are supposed to support NPIV. NPIV stands for N_Port ID Virtualization. It allows the FC I/F 303 to have virtual WWPNs (WWPN: World Wide Port Name). In this disclosure, the term of "WWPN" includes virtual WWPN realized by NPIV.

Figure 2:
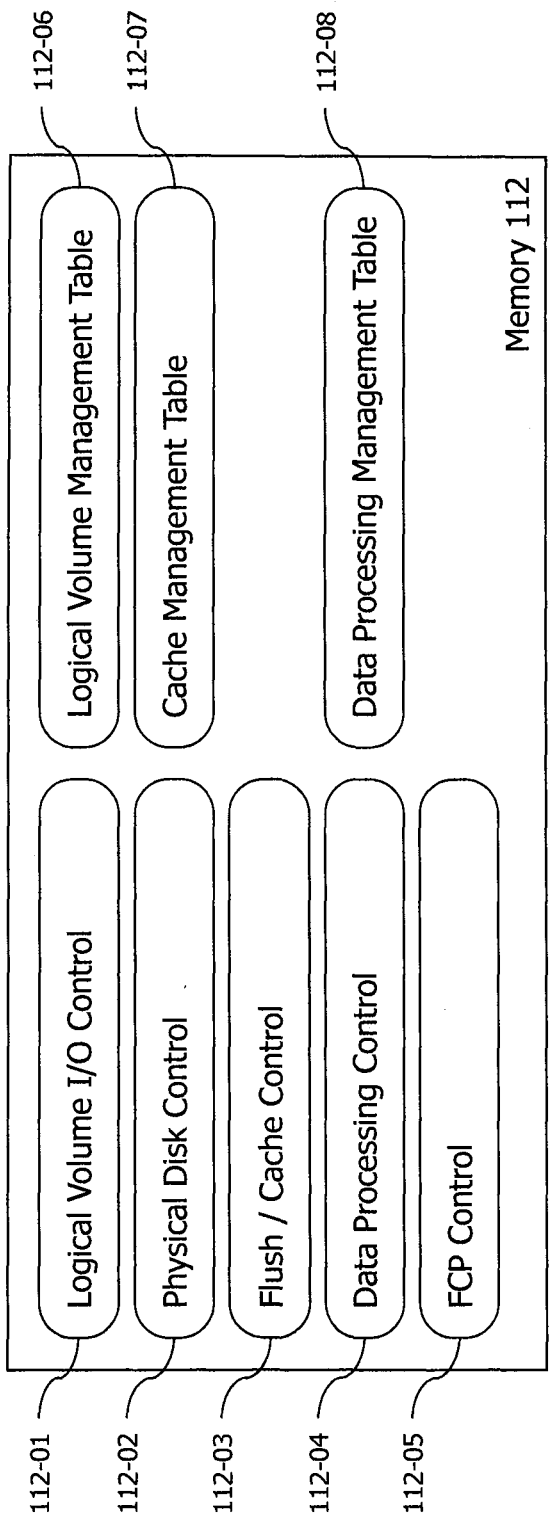
FIG. 2 shows an example of a software module configuration of the memory in the storage subsystem according to the first embodiment.

FIG. 2 shows an example of a software module configuration of the memory 112 in the storage subsystem 100 according to the first embodiment. It includes logical volume I/O control 112-01, physical disk control 112-02, flush/cache control 112-03, data processing control 112-04, FCP (Fibre Channel Protocol) control 112-05, logical volume management table 112-06, cache management table 112-07, and data processing management table 112-08.

Figure 3:
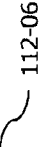
FIG. 3 shows an example of the logical volume management table.

FIG. 3 shows an example of the logical volume management table 112-06. The "WWPN" field represents the WWPN of the FC I/F 114 on the storage subsystem 100. The "LUN" field represents the LU Number on the storage subsystem. The "VOL #" field represents the volume on the storage subsystem. As seen in FIG. 3, when the host computer 300 accesses WWPN_3, it can connect to LUN 0 and LUN 1.

Figure 4:
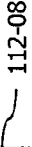
FIG. 4 shows an example of the data processing management table.
Figure 5:
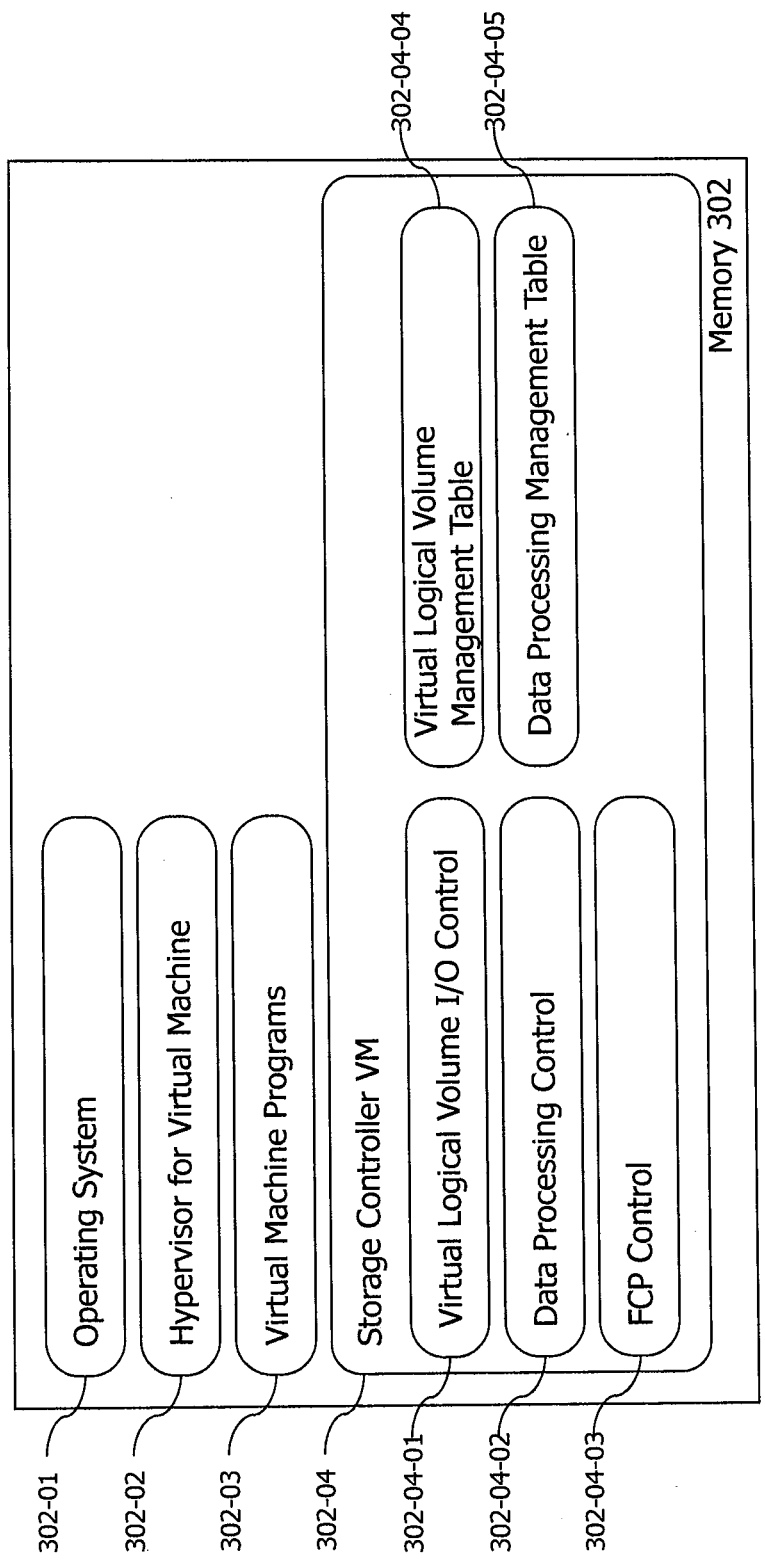
FIG. 5 shows an example of a software module configuration of the memory in the host according to the first embodiment.

FIG. 4 shows an example of the data processing management table 112-08. The "WWPN" field and "LUN" field represent the same context of each "WWPN" field and "LUN" field of the logical volume management table 112-06 in FIG. 3. The "Initiator WWPN" field represents the WWPN of the Initiator of host and/or other storage subsystems which include storage controller VM 302-04 as described below (FIG. 5). It allows the storage subsystem 100 to restrict access to the LU to achieve LUN Security. The "Processing Flag" field represents data processing options such as "compression" or "de-duplication" to the input/output data which is transmitted between the Initiator represented by "Initiator WWPN" field and the target volume associated with the "WWPN" and "LUN" fields.

FIG. 5 shows an example of a software module configuration of the memory 302 in the host 300 according to the first embodiment. It includes operating system 302-01, hypervisor for virtual machine 302-02, virtual machine programs 302-03, and storage controller VM 302-04. Hypervisor for virtual machine 302-02 is a program that allows virtual machine programs 302-03 and storage controller VM 302-04 to share hardware resources (Processor 301, Memory 302, FC I/F 303, Ethernet I/F 304 and Local Disk 305) of host 300. Virtual machine programs 302-03 and storage controller VM 302-04 are software implementations of a computing environment in which an operating system and/or programs can be installed and run. Hypervisor for virtual machine 302-02 controls allocating the hardware resources and making sure that the virtual machines cannot disrupt each other. The storage controller VM 302-04 is a processing module that acts as storage controller to offload the storage controller 110 processing. The storage controller VM 302-04 has target control units which are offloaded from the storage controller 110, and related control units to offload target control units. In this embodiment 1, the storage controller VM 302-04 includes virtual volume I/O control 302-04-01, data processing control 302-

04-02, FCP control 302-04-03, virtual volume management table 302-04-04, and data processing management table 302-04-05. The storage controller VM 302-04 is allocated by the management server 400 as a form of Virtual Machine (VM), but it is not limited to this.

Figure 6:
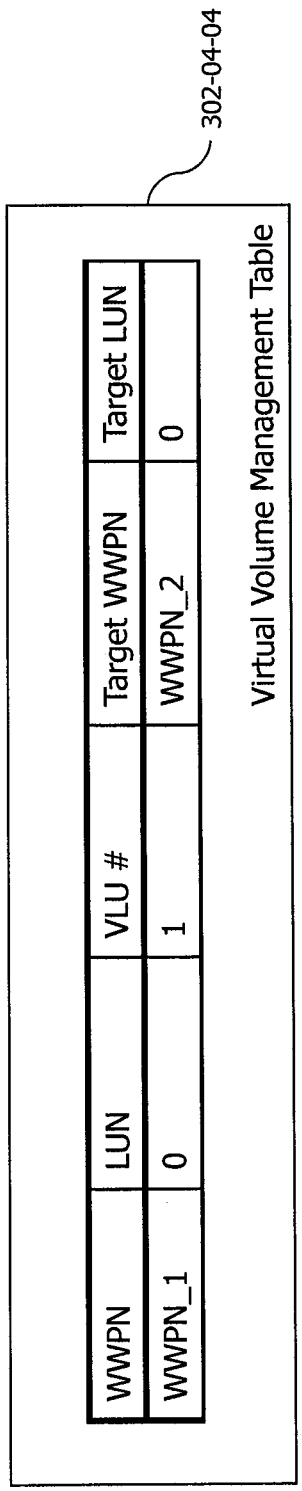
FIG. 6 shows an example of the virtual volume management table.

FIG. 6 shows an example of the virtual volume management table 302-04-04. The storage controller VM 302-04 involves the storage virtualization technology. The storage controller VM 302-04 and storage subsystem 100 are connected to each other. When the host computer 300 connects to the Virtual LU on the storage controller VM 302-04, it can reach the LU on the storage subsystem 100 by connecting the virtual LU on the storage controller VM 302-04 and the LU on the storage subsystem 100. The "WWPN" field represents the WWPN of FC I/F 303 associated with the storage controller VM 302-04. The "LUN" field represents the virtual LUN on the storage controller VM 302-04. The "V-VOL #" field represents the virtual volume on the storage controller VM 302-04. The "Target WWPN" field represents the target WWPN of the storage subsystem 100 in order to connect to the storage subsystem 100. The "Target LUN" field represents the LUN on the storage subsystem 100 associated with the virtual LUN on the storage controller VM 302-04.

Figure 7:
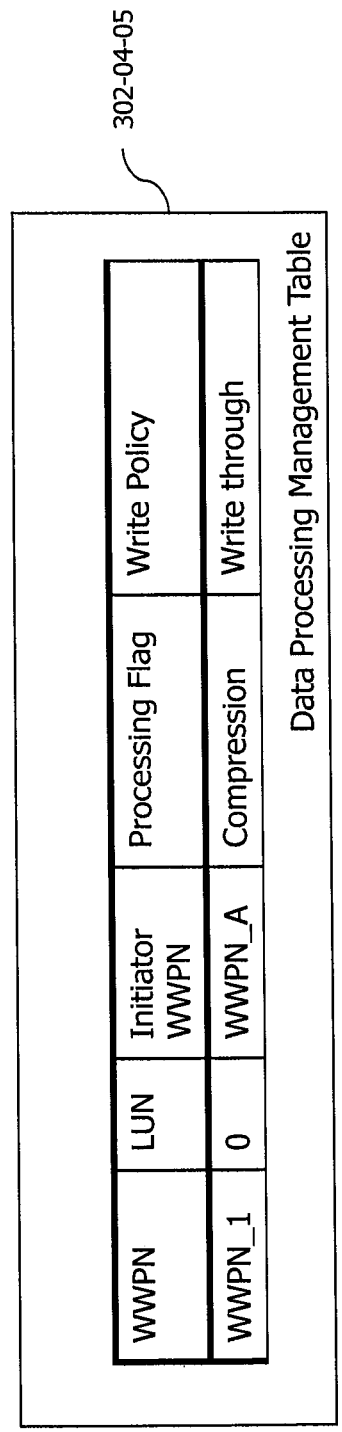
FIG. 7 shows an example of the data processing management table.

FIG. 7 shows an example of the data processing management table 302-04-05. The "WWPN" field and "LUN" field represent the same context of each "WWPN" field and "LUN" field of the virtual volume management table 302-04-04 in FIG. 6. The "Initiator WWPN" field represents the WWPN of the initiator of host and/or storage subsystems which include other storage controller VM 302-04. It allows the storage controller VM 302-04 to restrict access to the virtual LU to achieve LUN Security. The "Processing Flag" field represents data processing options such as "compression" or "de-duplication" to the input/output data which is transmitted between the initiator represented by "Initiator WNPN" field and the target volume associated with the "WWPN" and "LUN" fields of the data processing management table 302-04-05. The "Write Policy" field represents the timing of write to the LUN on the storage subsystem 100 (e.g., 'Write through," "Write back," and so on). Write-back is a caching method in which modifications to data in the virtual volume are not copied to the volume in the storage subsystem until absolutely necessary. In contrast, a write-through performs all write operations in parallel—data is written to the virtual volume and the volume in the storage subsystem simultaneously. Write-back yields somewhat better performance than write-through because it reduces the number of write operations to the main memory. With this performance improvement comes a slight risk that data may be lost if the system crashes.

Figure 8:
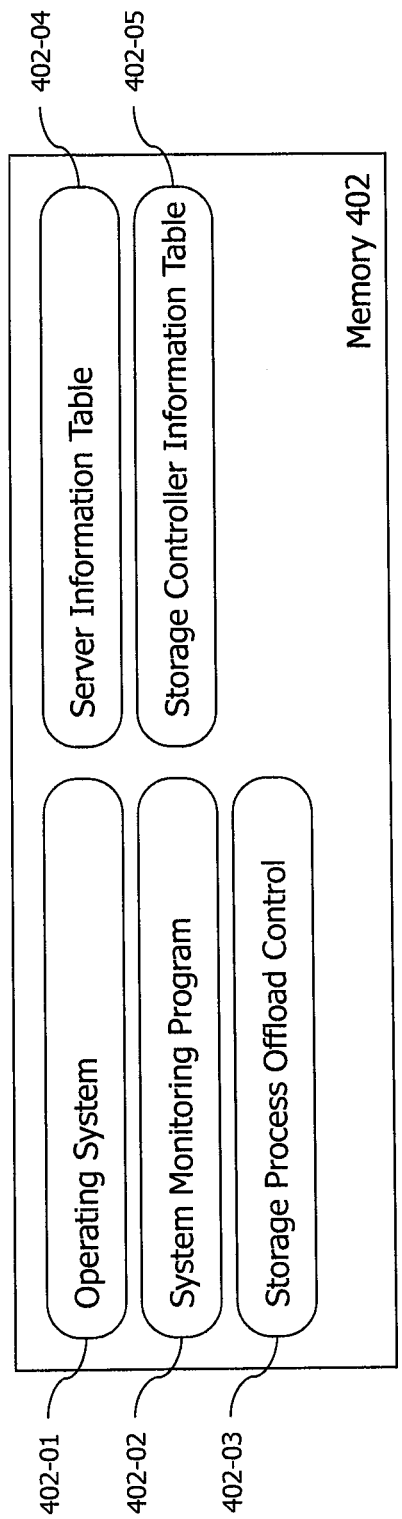
FIG. 8 shows an example of a software module configuration of the memory in the management server.

FIG. 8 shows an example of a software module configuration of the memory 402 in the management server 400. It includes operating system 402-01, system monitoring program 402-02, storage process offload control 402-03, server information table 402-04, and storage controller information table 402-05.

FIG. 9 shows an example of the server information table 402-04. The "Host #" field represents an identifier of the host 300. The "Processor" field represents a capacity of the processor 301 of the host 300. The "Memory" field represents a capacity of the memory 302 of the host 300. The "CPU Usage" field represents a percentage of processor 301 usage. The "Memory Usage" field represents a percentage of memory 302 usage.

FIG. 10 shows an example of the storage controller information table 402-05. The "Controller #" field represents an identifier of the storage controller 110. The "Processor" field represents a capacity of the processor 301 of the storage controller 110. The "Memory" field represents a capacity of the memory 302 of the storage controller 110. The "CPU Usage" field represents a percentage of processor 301 usage. The "Memory Usage" field represents a percentage of memory 302 usage. The "IOPS" field represents an average IOPS (Input/Output Per Second) of the storage controller 110.

The System Monitoring Program 402-02 collects performance information from the hosts 300 and updates the values of the "CPU Usage" and "Memory usage" of the server information table 402-04 by the conventional way (e.g., SNMP: Simple Network Management Protocol, and so on) and appropriate timing (e.g., at fixed intervals). The System Monitoring Program 402-02 collects performance information from the storage controller 100 and updates the values of the "CPU Usage," "Memory usage," and "IOPS" by the conventional way and appropriate timing.

Figure 11A:
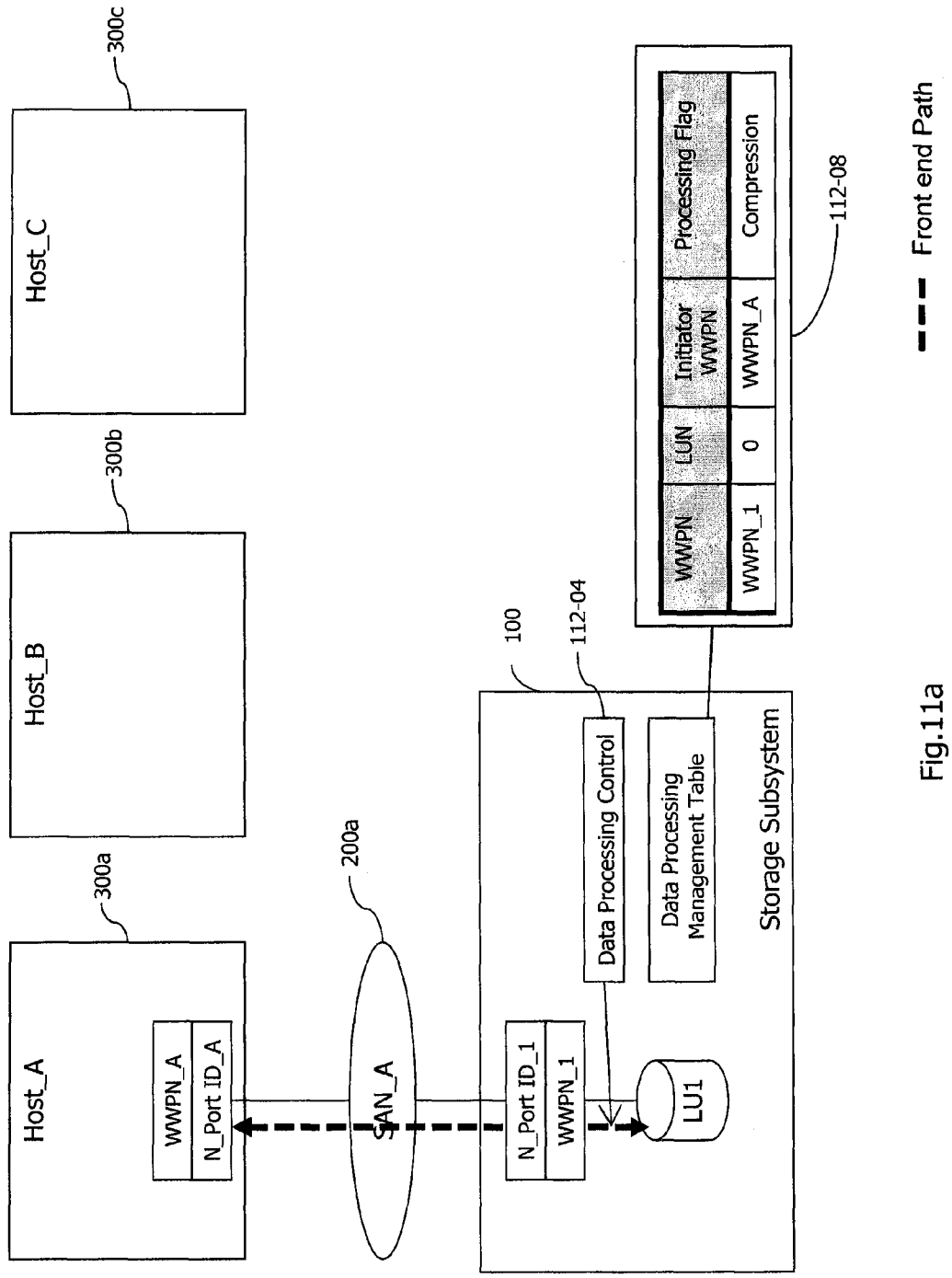
FIGS. 11a-11c illustrate an example of the offloading process of compression processing of storage subsystem using RSCN according to the first embodiment.
Figure 11B:
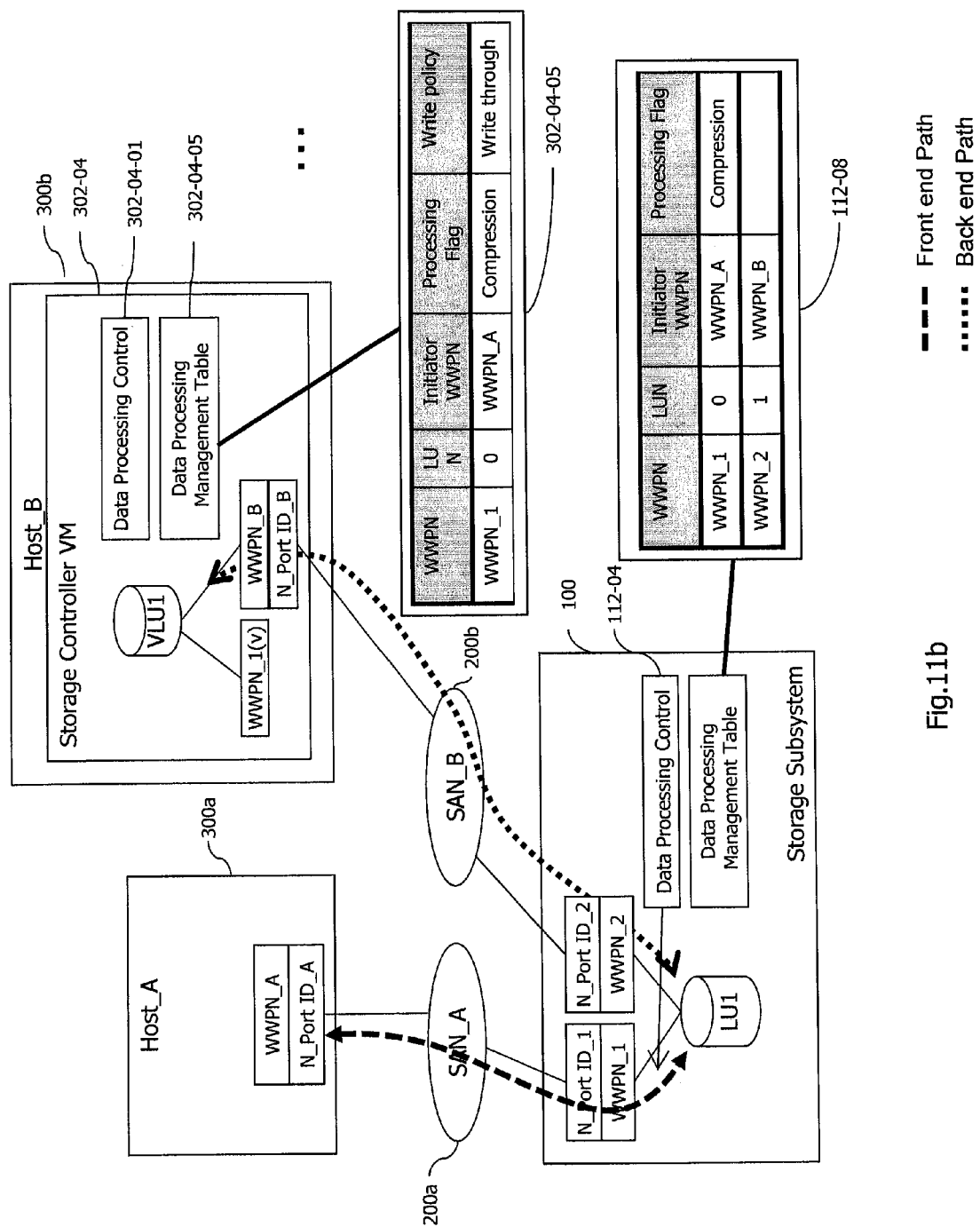
Figure 11C:
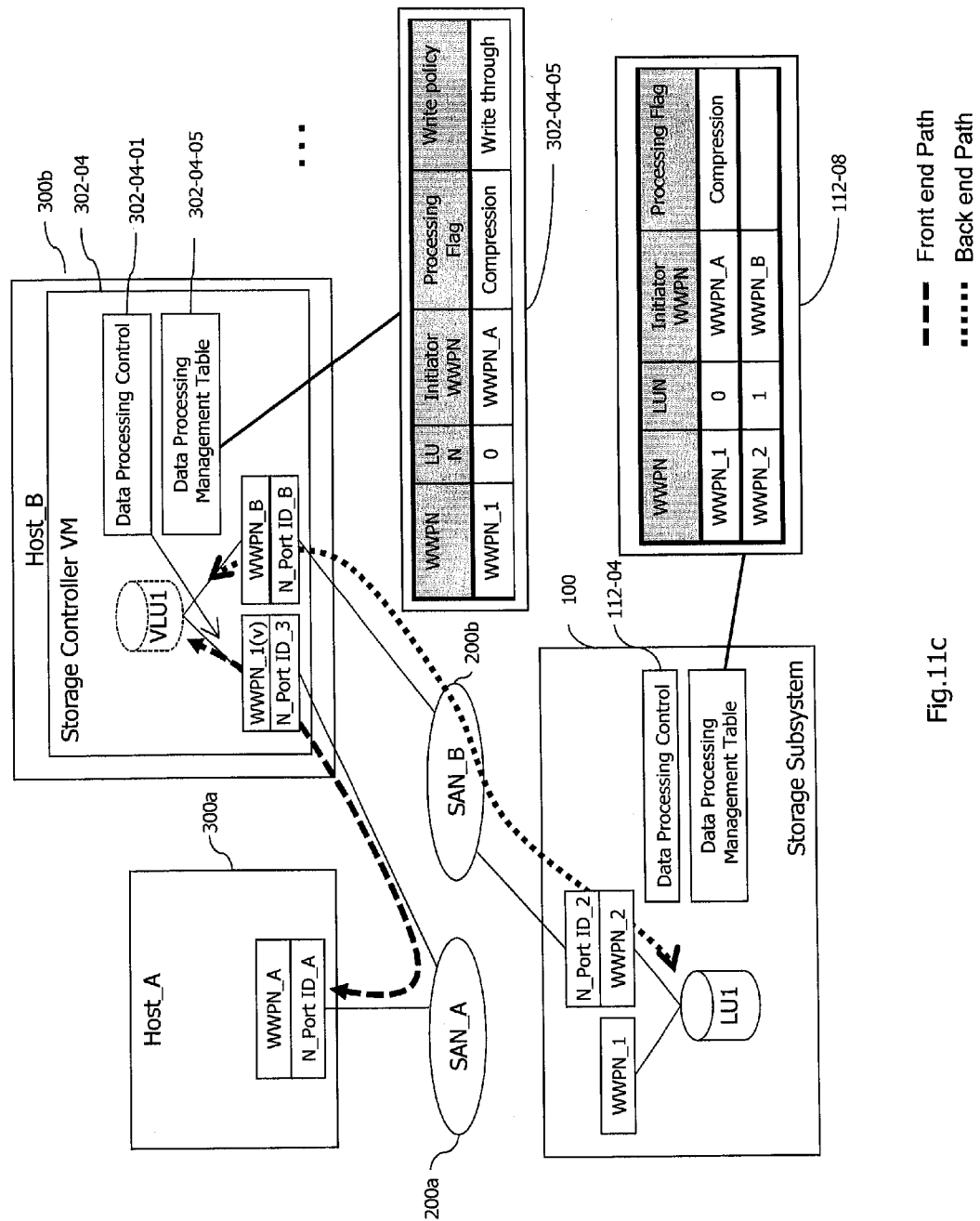

FIGS. 11a-11c illustrate an example of the offloading process of compression processing of storage subsystem using RSCN according to the first embodiment. RSCN stands for Registered State Change Notification. It sends notification to Fibre Channel nodes in the SAN fabric when the fabric Simple Name Service (SNS) database is changed (e.g., adding or removing a disk (target device), creating a new zone, etc.). This embodiment applies RSCN and NPIV to the storage subsystem 100 for offloading storage process to the host 300.

FIG. 11a shows the first status of the offloading process. The host 300a (which can be a physical host or a virtual host) connects to the storage subsystem 100 using Fibre Channel via the SAN 200a. The host 300a has WWPN_A, N_Port ID_A connected to the SAN 200a. The first storage subsystem has WWPN_, N_Port ID_1 which is connected to LU1 and to the SAN 200a. The data processing management table 112-08 is configured as shown in FIG. 11a, which means the host 300a is allowed to access LU 1 via FC port (WWPN_A) of the host 300a and FC port (WWPN_1) of the storage subsystem 100. Also, it means that the data processing control 112-04 compresses and de-compresses the data transmitted via these ports either post-process or in-line. In this embodiment 1, it is supposed that the system administrator notices the high load of the storage controller 110, and then requests the management server 400 to start offloading with specifying one or multiple rows of the data processing management table 112-08 and write policy ("write through"). We refer to the specified row as "offloading process info" below.

Figure 12:
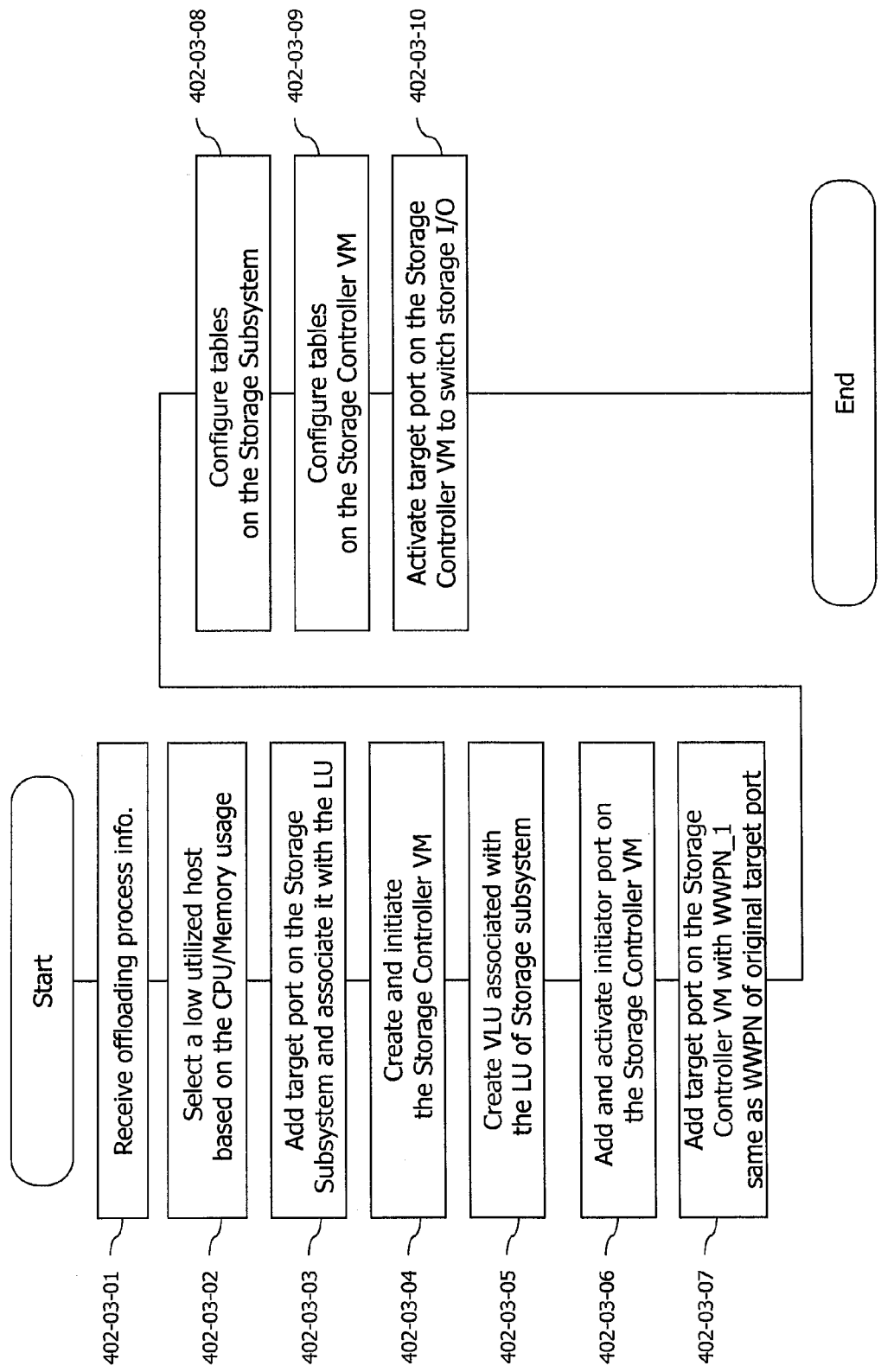
FIG. 12 is an example of a flow diagram illustrating a process flow of the Storage Process Offload Control as executed by the management server according to the first embodiment.

FIG. 12 is an example of a flow diagram illustrating a process flow of the Storage Process Offload Control 402-03 as executed by the management server 400 according to the first embodiment. In step 402-03-01, the program receives the offloading process information which is specified by the system administrator. In step 402-03-02, the program searches a host 300 which has the lowest load based on the CPU/Memory usage data of the server information table 402-04. In this embodiment 1, the server information table 402-04 stores the records as shown in FIG. 9, and then Host_B (host 300b) is selected because of the lowest usage of its own computer resources (e.g., processor and memory). In step 402-03-03, the program adds a target port (WWPN_2) connecting to the SAN 200b on the storage subsystem 100, and associates the target port (WWPN_2) with LU1. Also the Storage Process Offload Control 402-03 activates the added target port (WWPN_2). This allows the storage subsystem 100 to send an FOISC message to the SAN 200b in order to get a new N_Port ID (N_Port ID_2) for the added target port (WWPN_2). In step 402-03-04, the program creates and initiates the Storage Controller VM 302-04 on the selected host 300b by the conventional way such as virtual machine creation from system image files.

In step 402-03-05, the program searches LUs referred to in the offloading process info using the local volume management Table 112-06 on the storage subsystem 100, and then creates virtual LUs on the Storage Controller VM 302-04 and associates them with the corresponding LUs (LU1) of the storage subsystem 100 using the storage virtualization function. Examples of the storage virtualization function can be found in U.S. Pat. Nos. 7,003,634 and 7,228,380. In this embodiment 1, VLU1 is created and associated to LU1. In step 402-03-06, the program adds and activates an initiator port (WWPN_B) connecting to the SAN 200b on the Storage Controller VM 302-04. In step 402-03-07, the program adds a target port for VLU1 on the Storage Controller VM 302-04, where the WWPN of the added target port is the same as the WWPN (WWPN_1) of the offloading process info received in step 402-03-01.

In step 402-03-08, the program configures the logical volume management table 112-06 to associate the target volume (LU1) with the target port (WWPN_2) which was added in step 402-03-03. Also, the data processing management table 112-08 is configured as shown in FIG. 11b which means that it allows access to the volume (LU1) via the initiator port (WWPN_B) which was added in step 402-03-06.

In step 402-03-09, the program configures the virtual volume management table 302-04-04 and the data processing management table 402-04-05 on the Storage Controller VM 302-04. In this embodiment 1, the virtual volume management table 302-04-04 is configured as shown in FIG. 6 in order to associate the created target port (WWPN_1(v)) and the VLU1, and also associate the VLU1 of the Storage Controller VM 302-04 and the LU1 (target WWPN: WWPN_2, LUN: 0) of the storage subsystem 100. Also, the data processing management table 302-04-05 is configured as shown in FIG. 11b using the offloading process info and write policy received in step 402-03-01.

FIG. 11b shows the second status of the offloading process after step 402-03-09 of FIG. 12. Host_B 300b deploys the Storage Controller VM 302-04 and prepares the data processing management table 302-04-05 and ports for connection to the storage subsystem 100. Host_B 300b has VLU1 storing the difference data with respect to LU1. A path is established between VLU1 and LU1 via WWPN_B, N_Port ID_B in the Storage Controller VM 302-04 of Host B 300b, through SAN_B 200b, via N_Port ID_2, WWPN_2 of the storage subsystem 100. The data processing management table 302-04-05 in Host_B 300b shows write through for target WWPN_1 and initiator WWPN_A with compression as processing flag. The data processing management table 112-08 in the storage subsystem 100 shows target WWPN_2 and initiator WWPN_B.

In step 402-03-10, the program activates the target port (WWPN_1(v)) which was added in step 402-03-07. This allows the Storage Controller VM 302-04 to log into the SAN 200a in order to get a new N_Port ID for the target port (WWPN_1(v). As a result, WWPN_1 is registered into the SNS database of the SAN 200a. Then, the SAN 200a sends a RSCN to the host computer 300a. The host computer 300a sends a LOGOUT to logout after I/O completion (according to a Fibre Channel scheme to release N_Port ID_1 of the storage subsystem 100). Next, the host computer 300a gets the current information of the SNS database, and the SNS database of SAN 200a provides the new N_Port ID for the WWPN_1 on the Storage Controller VM 302-04 (WWPN_1 (v), N_Port ID_3). This mechanism allows the host computer 300a to switch I/O from the storage subsystem 100 to the Storage Controller VM 302-04. The method of switching I/O is not limited to that described in this step 402-03-10. Examples of the Switching I/O methods can be found in U.S. Pat. No. 7,849,265 and US2010/0070722.

FIG. 11c shows the third status of the offloading process after step 402-03-10 of FIG. 12. A path is established between VLU1 and Host_A 300a via WWPN_1(v), N_Port ID_3 in the Storage Controller VM 302-04 of Host B 300b, through SAN_A 200a, via WWPN_A, N_Port ID_A of Host_A 300a.

As shown above, the workload of the storage subsystem is offloaded to the host. By repeating the process in the above flow diagram, the workloads of the storage subsystem can be offloaded to multiple hosts.

Embodiment 2: Storage De-Duplication Process Offloading to Low Usage Server

The second embodiment discloses how to offload storage de-duplication process to a low usage server (host) while volume is used. The system configuration and procedure are almost the same as embodiment 1. Only the differences with respect to embodiment 1 will be described.

Figure 13:
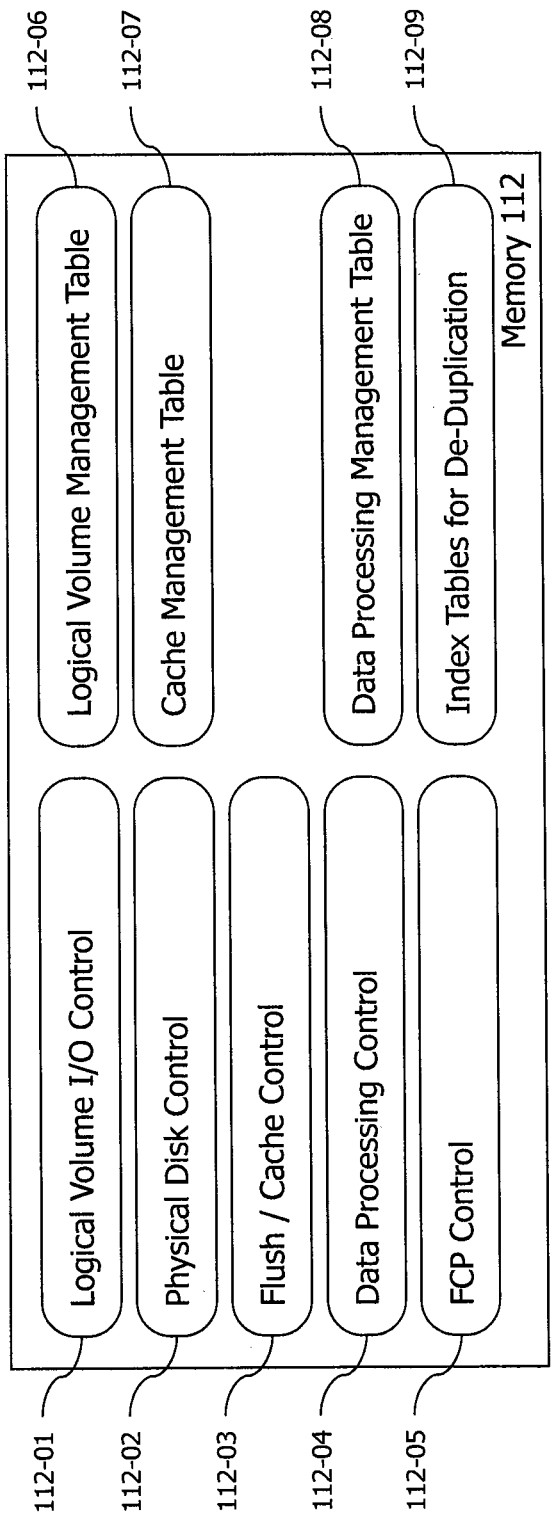
FIG. 13 shows a software module configuration of the memory in the storage subsystem according to the second embodiment.

FIG. 13 shows a software module configuration of the memory 112 in the storage subsystem 100 according to the second embodiment. This configuration is almost the same as the configuration of embodiment 1 (FIG. 2). This configuration has Index Tables for De-Duplication 112-09. It is the only difference.

Figure 14:
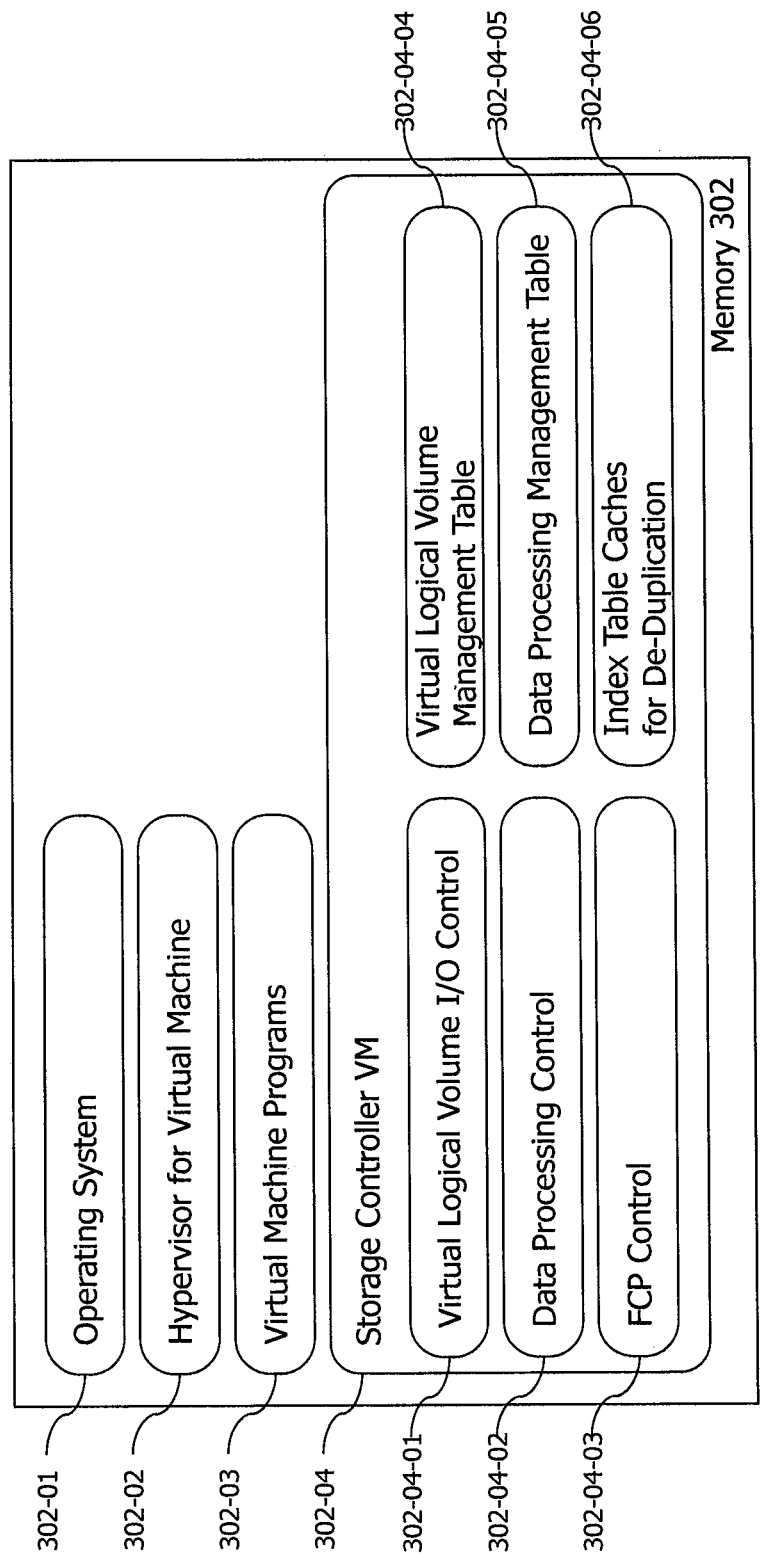
FIG. 14 shows a software module configuration of the memory in the host according to the second embodiment.

FIG. 14 shows a software module configuration of the memory 302 in the host 300 according to the second embodiment. This configuration is almost the same as the configuration of embodiment 1 (FIG. 5). This configuration has Index Table Caches for De-Duplication 302-04-06. It is the only difference.

Figure 15A:
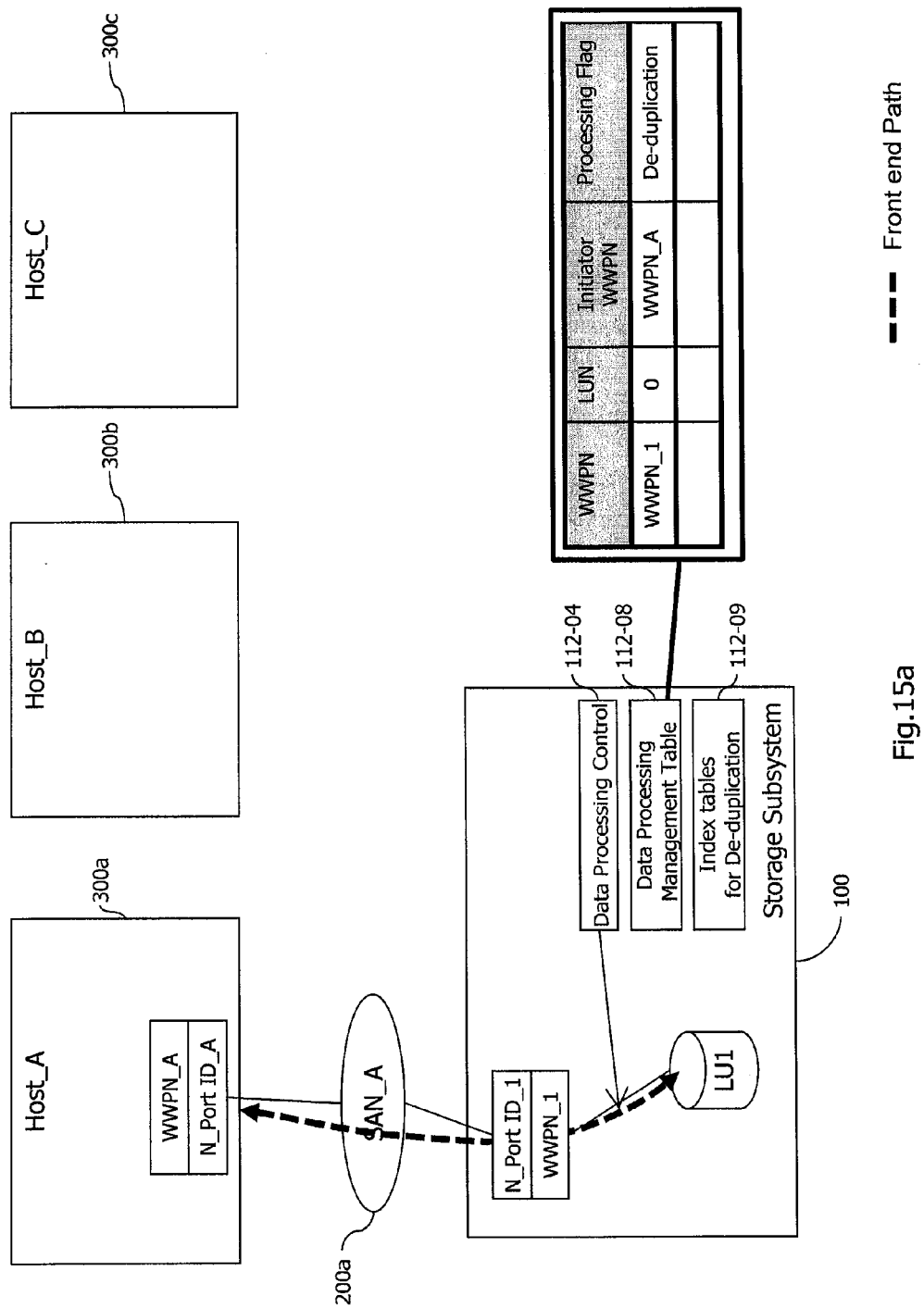
FIGS. 15a-15c illustrate an example of the offloading de-duplication process of the storage subsystem according to the second embodiment.
Figure 15B:
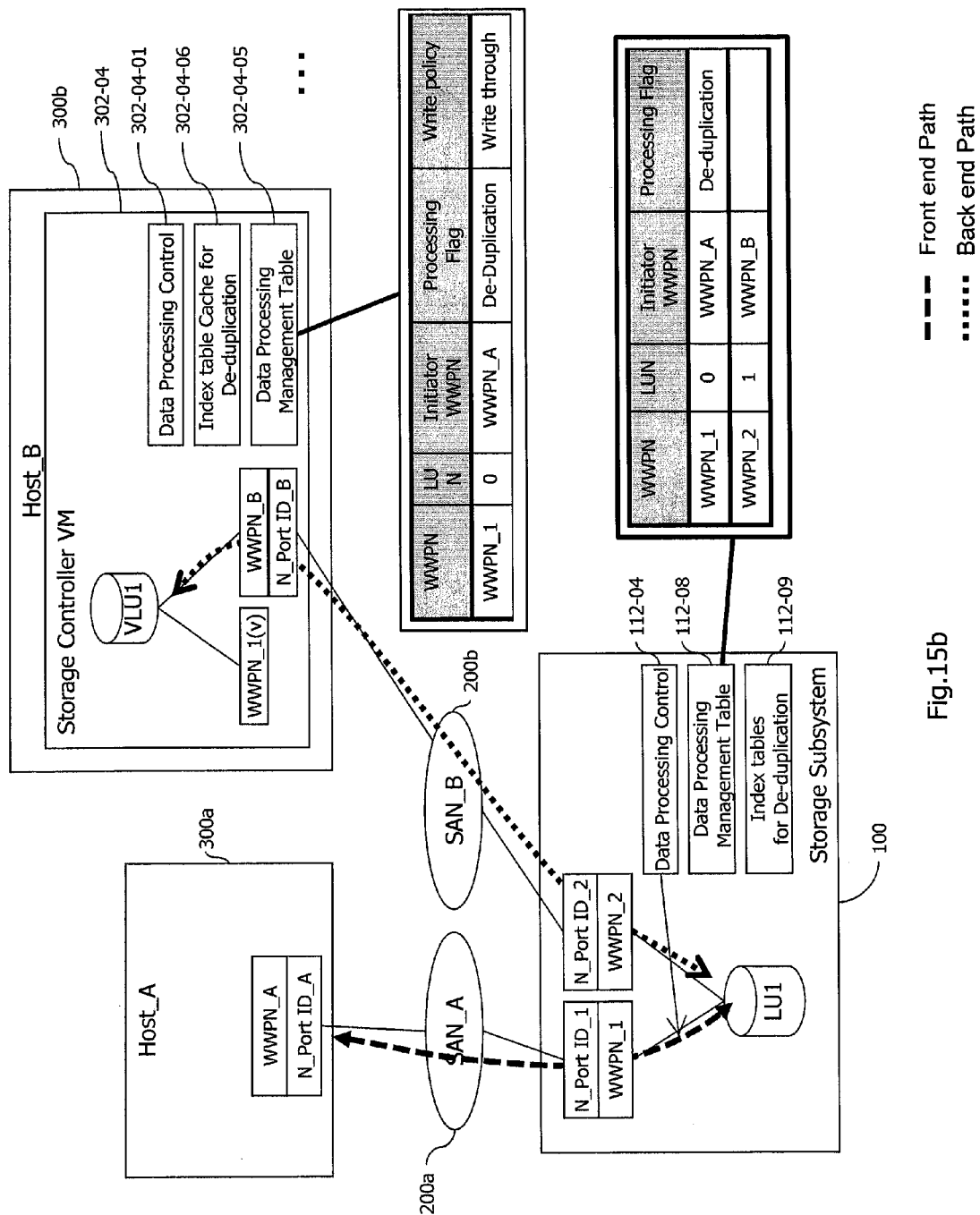
Figure 15C:
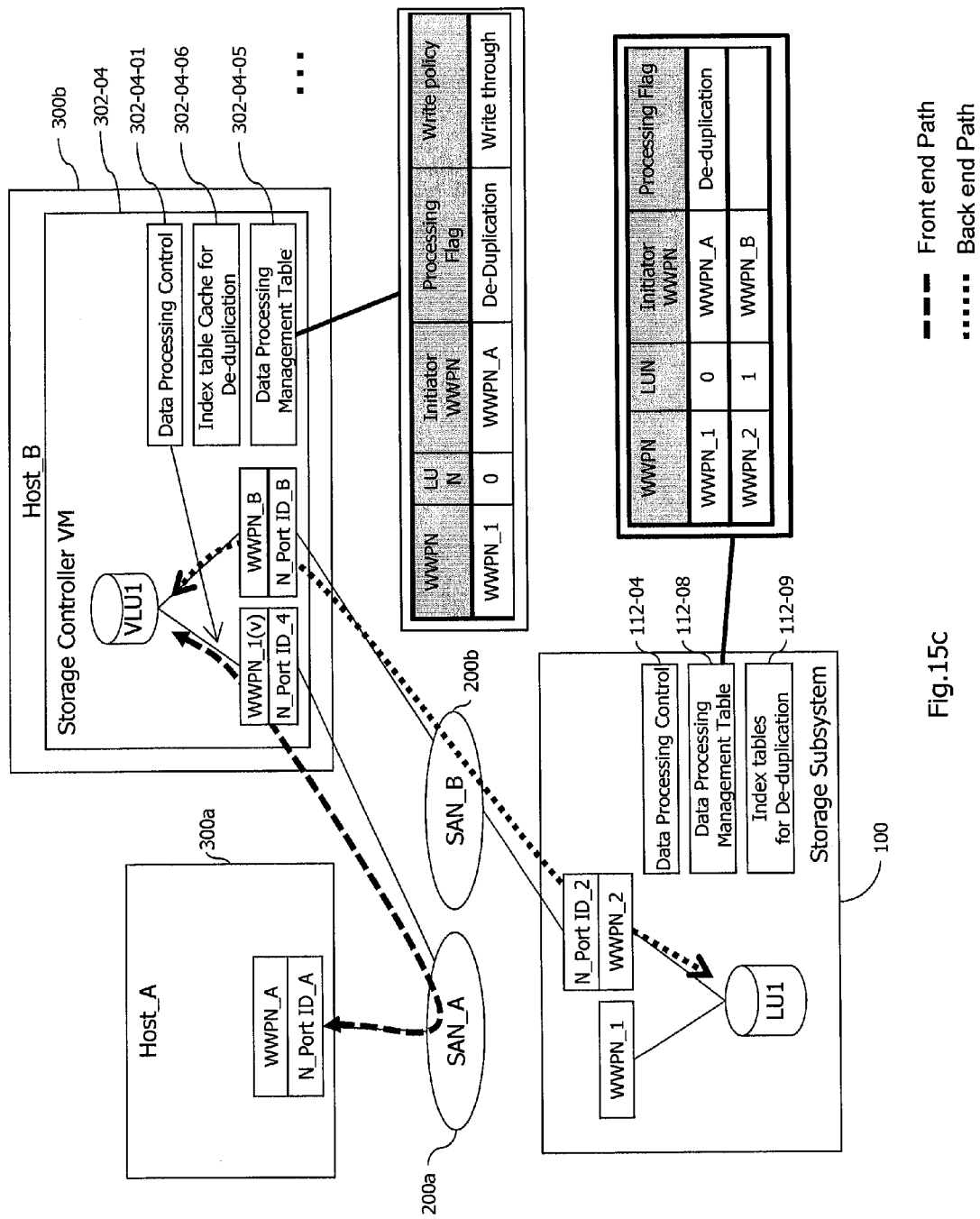

FIGS. 15a-15c illustrate an example of the offloading de-duplication process of the storage subsystem according to the second embodiment. This embodiment 2 applies RSCN and NPIV to the storage subsystem 100 for offloading storage process to the host 300.

FIG. 15a shows the first status of the offloading process of this embodiment 2. This first status is almost the same as the first status of embodiment 1 (FIG. 11a). This first status has Index Tables for De-Duplication 112-09 on the storage subsystem 100. Also, the "Processing Flag" field value of the first entry of the data processing management table 112-08 is "De-duplication." These are the differences. It means that Data Processing Control 112-04 de-duplicates the data transmitted via these ports either post-process or in-line. Index tables are created for each LU or some of the LUs, and index data of de-duplication are stored in each of the index tables. In case of block-level de-duplication, hashes for each of the input data blocks and reference address of stored data are computed and stored in the index table. When new data enters the storage controller, block hashes are computed and compared with entries in the index table. In case of a match, block data is replaced with reference address to the existing block. An entry is made in the index table for all other cases.

Figure 16:
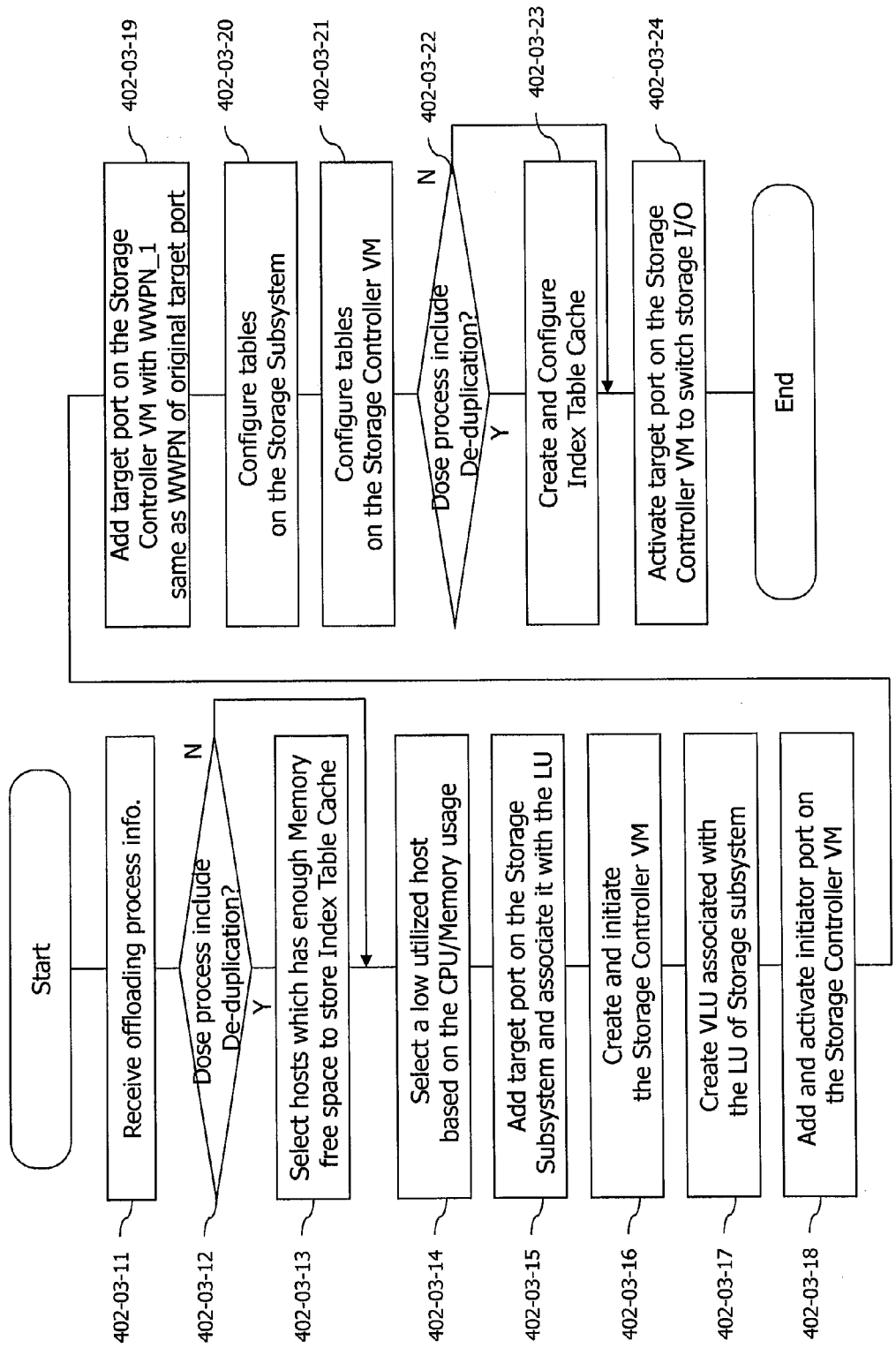
FIG. 16 is an example of a flow diagram illustrating a process flow of the Storage Process Offload Control as executed by the management server according to the second embodiment.

FIG. 16 is an example of a flow diagram illustrating a process flow of the Storage Process Offload Control 402-03 as executed by the management server 400 according to the second embodiment. In step 402-03-11, the program receives the offloading process information which is specified by the system administrator. In step 402-03-12, the program checks whether the offloading process info includes "De-duplication" as a "Processing Flag" field or not. If it includes "De-duplication," the program performs step 402-03-13; otherwise, the program skips step 402-03-13 and proceeds to step 402-03-14. In step 402-03-13, the program obtains a total index table size of index tables referring to the target LUs. Then, the program searches hosts 300 which have enough memory free space to store index table caches using the server information table 402-04. In this embodiment, target LU is only one LU (LU1), but it is not limited to this. In step 402-03-14, the program searches a host 300 which has the lowest load based on the CPU/Memory usage data of the server information table 402-04. If the hosts 300 are selected in step 402-03-13, the hosts 300 list from step 402-03-13 is the restriction for step 402-03-14. In this embodiment 2, the server information table 402-04 stores the records as shown in FIG. 9, and then Host_B (host 300b) is selected because of the lowest usage of processor and memory.

Steps 402-03-15 to 402-03-21 are almost the same as steps 402-03-03 to 402-03-09 in the embodiment 1 (FIG. 12).

In step 402-03-22, the program checks whether the offloading process info includes "De-duplication" as a "Processing Flag" field or not. If it includes "De-duplication," the program performs step 402-03-23; otherwise, the program skips step 402-03-23 and proceeds to step 402-03-24. In step 402-03-23, the program creates and configures index table caches (302-04-06) on the Storage Controller VM 302-04 to calculate hash value faster.

FIG. 15b shows the second status of the offloading process after step 402-03-23 of FIG. 16. Host_B 300b deploys the Storage Controller VM 302-04 and prepares the data processing management table 302-04-05 and ports for connection to the storage subsystem 100. Host_B 300b has VLU1 storing the difference data with respect to LU1. A path is established between VLU1 and LU1 via WWPN_B, N_Port ID_B in the Storage Controller VM 302-04 of Host B 300b, through SAN_B 200b, via N_Port ID_2, WWPN_2 of the storage subsystem 100. The data processing management table 302-04-05 in Host_B 300b shows write through for target WWPN_1 and initiator WWPN_A with de-duplication as processing flag. The data processing management table 112-08 in the storage subsystem 100 shows target WWPN_2 and initiator WWPN_B.

Step 402-03-24 is almost the same as step 402-03-10 in the embodiment 1 (FIG. 12). In this embodiment, the target port in Host_B 300b is WWPN_2(v), N_Port ID_4 for connection to the initiator port WWPN_A, N_Port ID_A in Host_A 300a.

FIG. 15c shows the third status of the offloading process after step 402-03-24 of FIG. 16. A path is established between VLU1 and Host_A 300a via WWPN_2(v), N_Port ID_4 in the Storage Controller VM 302-04 of Host B 300b, through SAN_A 200a, via WWPN_A, N_Port ID_A of Host_A 300a.

Embodiment 3: Storage Process Offloading to Low Usage Server in the Multi-Path Environment The third embodiment discloses how to offload storage de-duplication process to a low usage server (host) in a multi-path environment. The system configuration and procedure are almost the same as embodiment 2. Only the differences with respect to embodiment 2 are described.

Figure 17A:
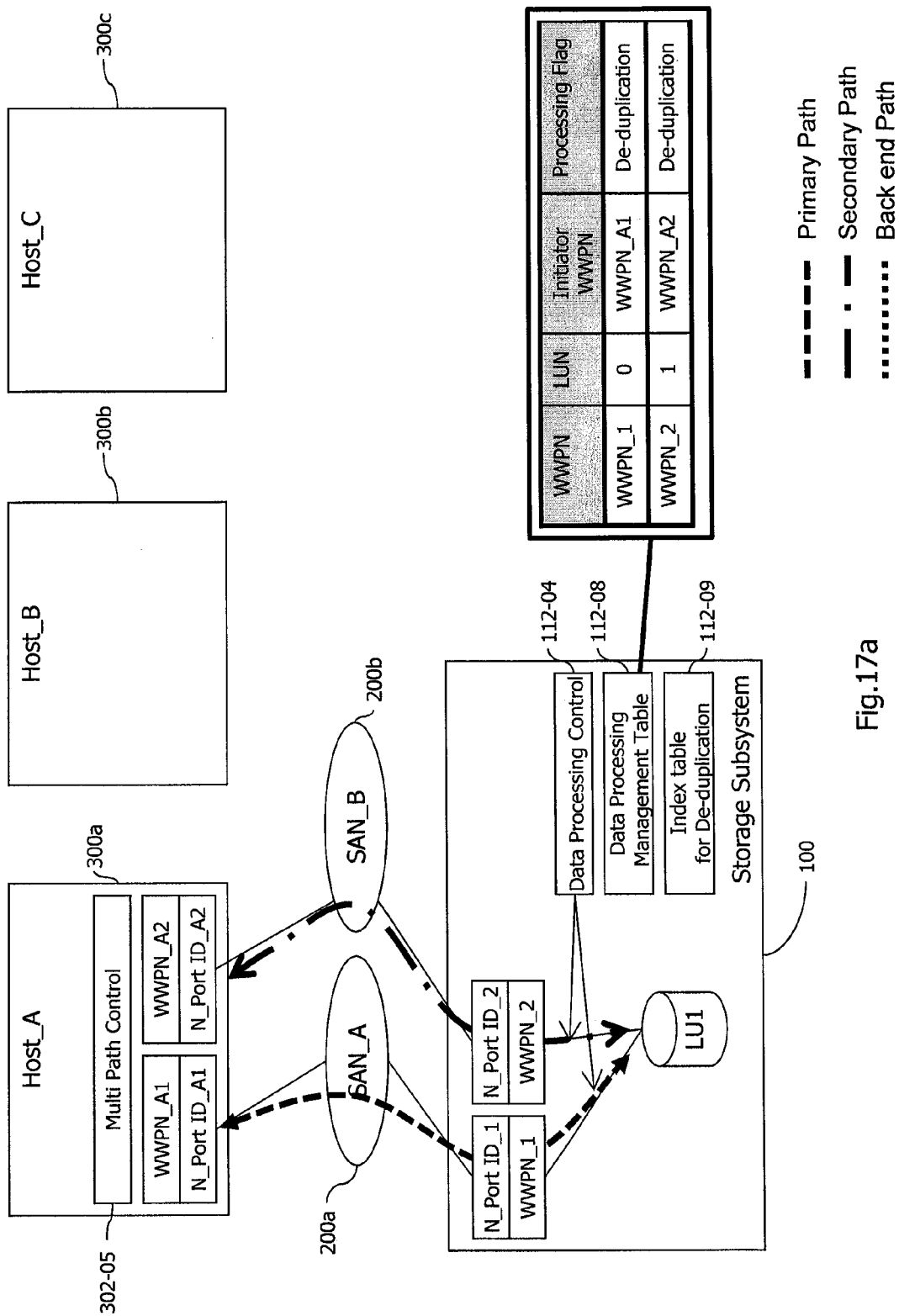
FIGS. 17a-17c illustrate an example of the offloading de-duplication process of the storage subsystem according to the third embodiment.
Figure 17B:
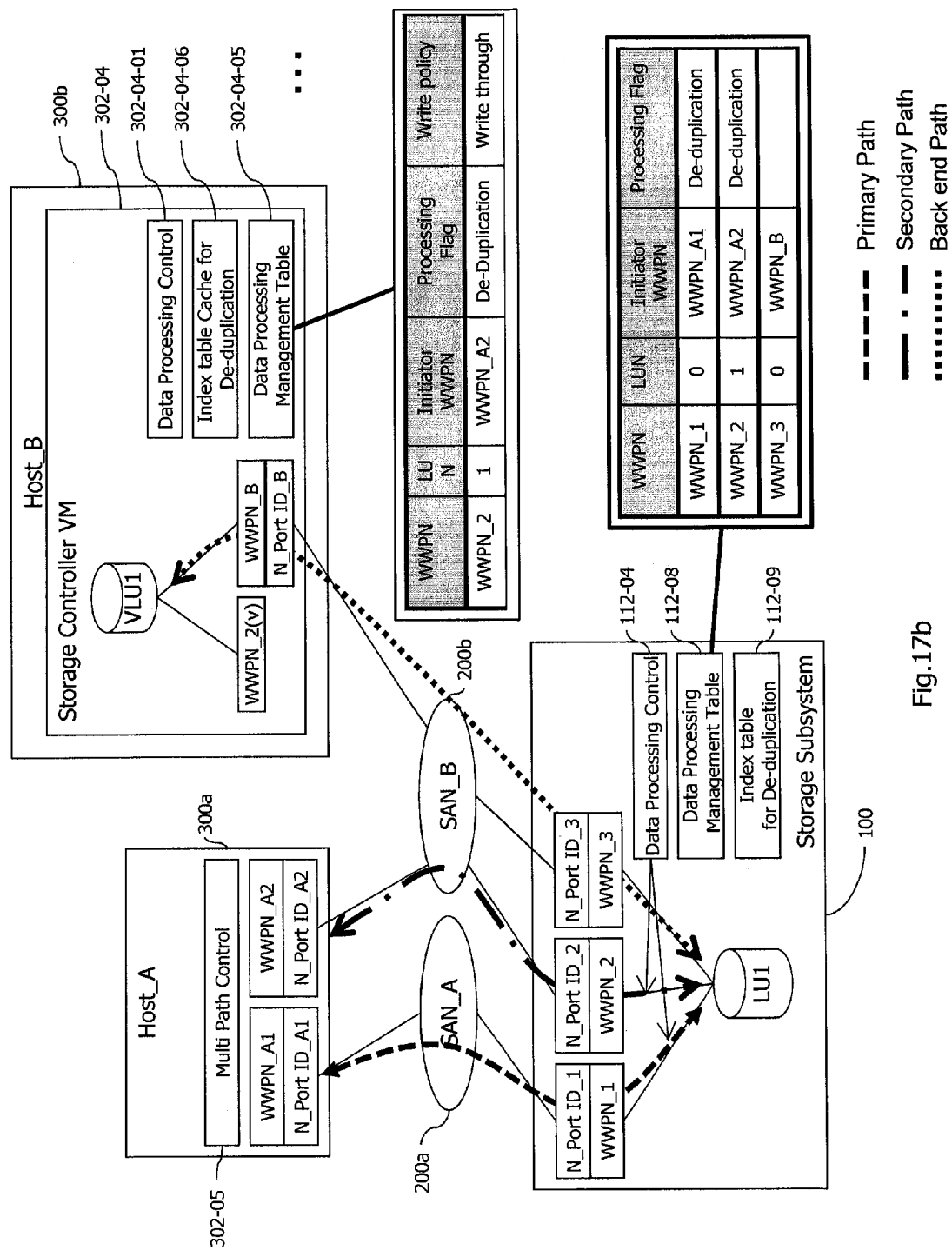
Figure 17C:
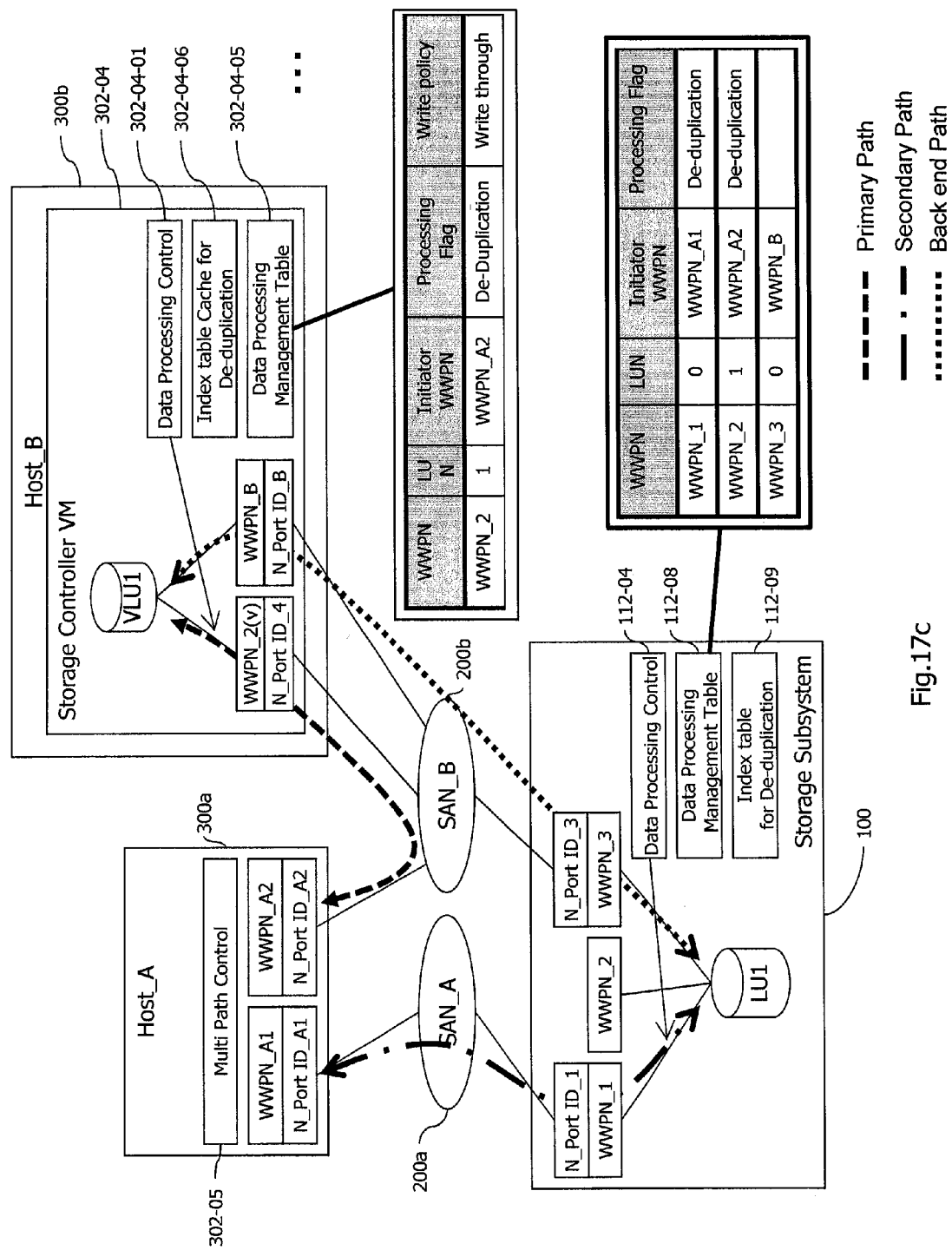

FIGS. 17a-17c illustrate an example of the offloading de-duplication process of the storage subsystem according to the third embodiment. This embodiment 3 applies Multi Path Control 302-05 and ALUA (Asymmetric Logical Unit Access) to control the paths. Multi Path Control 302-05 is supported by Operating System 302-01 and/or Hypervisor 302-02 in general (e.g., Microsoft MPIO). ALUA is a SCSI standard that allows multiple controllers to route I/O to a given logical unit.

FIG. 17a shows the first status of the offloading process of this embodiment 3. In this first status, Host_A 300a is configured to use two ports (WWPN_A1, WWPN_A2) to access LU1. Also, the storage subsystem 100 is configured to use two ports (WWPN_1, WWPN_2). The logical volume management table 112-06 of the storage subsystem 100 is configured as shown in FIG. 3. This first status has Index Tables for De-Duplication 112-09 on the storage subsystem 100 (as in FIG. 15a). The data processing management table 112-08 of the storage subsystem 100 is configured as shown in FIG. 17a. Host_A (300a) accesses the LU1 via SAN_A (200a) as the primary path and via SAN_B (200b) as the secondary path.

Figure 18:
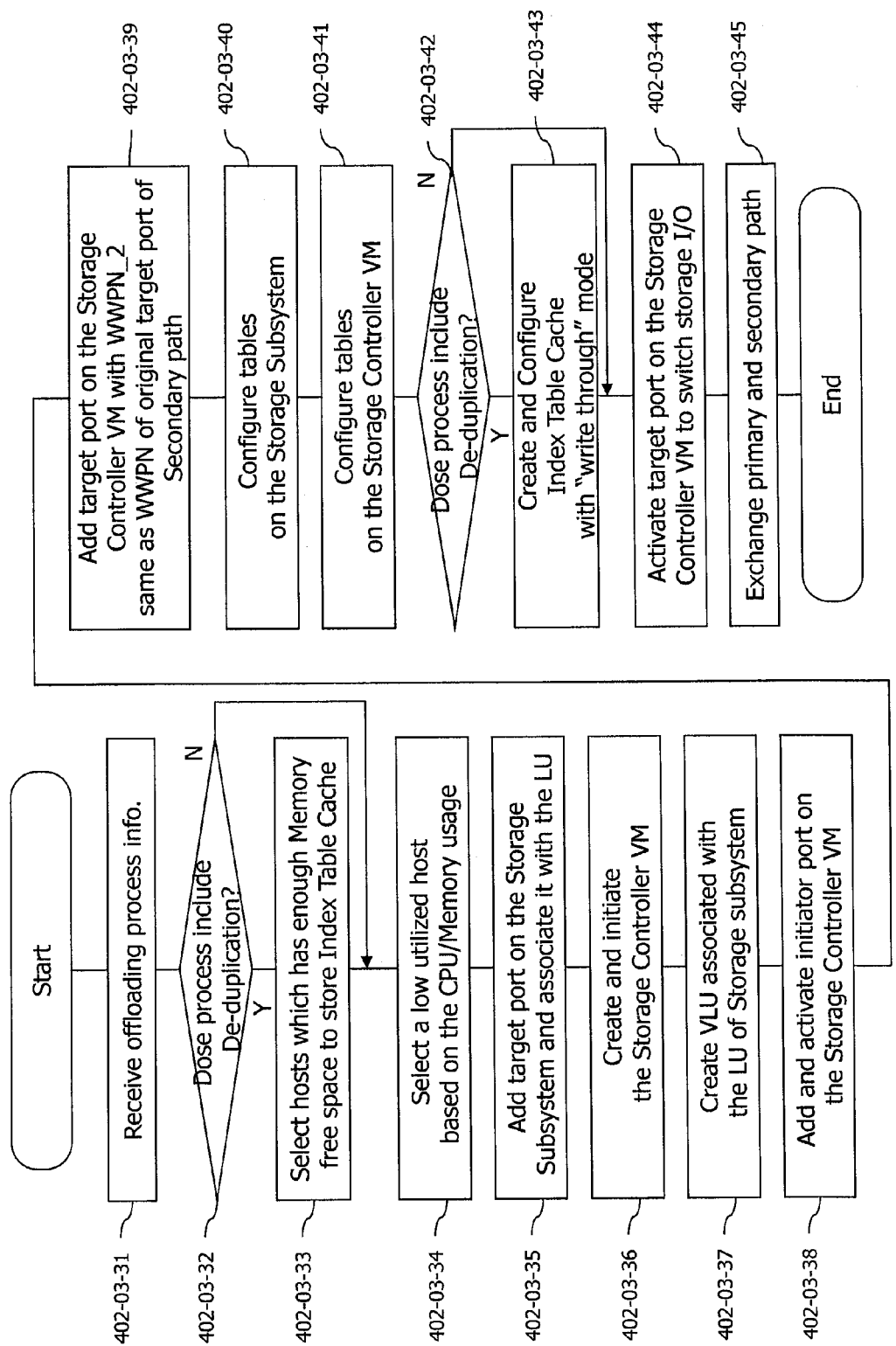
FIG. 18 is an example of a flow diagram illustrating a process flow of the Storage Process Offload Control as executed by the management server according to the third embodiment.

FIG. 18 is an example of a flow diagram illustrating a process flow of the Storage Process Offload Control 402-03 as executed by the management server 400 according to the third embodiment. Steps 402-03-31 to 402-03-44 are almost the same as steps 402-03-11 to 402-03-24 in embodiment 2 (FIG. 16). The differences are discussed below.

In step 402-03-31, the program receives the offloading process information which is the second row of the data processing management table 112-08 in the storage subsystem 100 shown in FIG. 17a. In step 402-03-35, the program adds a target port WWPN_3 connecting to the SAN 200b on the storage subsystem 100, and associates the target port (WWPN_3) with LU1. In step 402-03-39, the program adds a target port for VLU1 on the Storage Controller VM 302-04, where the WWPN of the added target port is the same as the WWPN (WWPN_2) of the offloading process info received in step 402-03-31. In step 402-03-40, the program configures the logical volume management table 112-06 to associate the target volume (LU1) with the target port (WWPN_3) as shown in FIG. 19. Also, the data processing management table 112-08 is configured as shown in FIG. 17b, which means that it allows access to the volume (LU1) via the initiator port (WWPN_B) which was added in step 402-03-38.

In step 402-03-41, the virtual volume management table 302-04-04 is configured as shown in FIG. 20 in order to associate the created target port (WWPN_2(v) and the VLU1, and to associate the VLU1 of the Storage Controller VM 302-04 and the LU1 (target WWPN: WWPN_3, LUN: 0) of the storage subsystem 100. Also, the data processing management table 302-04-05 is configured as shown In FIG. 17b using the offloading process info and write policy received in step 402-03-31.

In step 402-03-43, the program creates and configures index table caches (302-04-06) on the Storage Controller VM (302-04) to calculate the hash value faster. To keep consistency between index table and Index table cache, "write through" mode can be used to write policy of index table cache. Also, write lock feature of database can be used for keeping consistency between index table and index table cache. This consistency is desirable in this embodiment due to the step of exchanging the primary path and the secondary path in step 402-03-45 described below.

FIG. 17b shows the second status of the offloading process after step 402-03-43 of FIG. 18. Host_B 300b deploys the Storage Controller VM 302-04 and prepares the data processing management table 302-04-05 and ports for connection to the storage subsystem 100. Host_B 300b has VLU1 storing the difference data with respect to LU1. A path is established between VLU1 and LU1 via WWPN_B, N_Port ID_B in the Storage Controller VM 302-04 of Host B 300b, through SAN_B 200b, via N_Port ID_3, WWPN_3 of the storage subsystem 100. The data processing management table 302-04-05 in Host_B 300b shows write through for target WWPN_2 and initiator WWPN_A2 with de-duplication as processing flag. The data processing management table 112-08 in the storage subsystem 100 shows target WWPN_3 and initiator WWPN_B.

In step 402-03-45, the program exchanges the primary path and secondary path by setting target port (WWPN_2(v)) as "Active/optimal" using ALUA standard. An advantage is that there is no need to disrupt the I/O. In this embodiment, the target port in Host_B 300b is WWPN_2(v), N_Port ID_4 for connection to the initiator port WWPN_A2, N_Port ID_A2 in Host_A 300a.

FIG. 17c shows the third status of the offloading process after step 402-03-45 of FIG. 18. A path is established between VLU1 and Host_A 300a via WWPN_2(v), N_Port ID_4 in the Storage Controller VM 302-04 of Host B 300b, through SAN_B 200b, via WWPN_A2, N_Port ID_A2 of Host_A 300a.

Of course, the system configuration illustrated in FIG. 1 is purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for offloading storage workload. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A computer comprising:
a memory; and
a controller operable to manage a relationship among port information of an initiator port, information of a logical volume storing data from the initiator port, and port information of a target port to be used for storing data from the initiator port to the logical volume, and to cause another computer to process a storage function of a storage system including the logical volume and the target port by creating a virtual machine for executing the storage function on said another computer, and by creating a virtual logical volume on the virtual machine and associating the virtual logical volume on the virtual machine on said another computer with the logical volume in the storage system, said another computer sending the data to the logical volume of the storage system after executing the storage function.

2. The computer according to claim 1,
wherein by executing the storage function on said another computer, the workload of executing the storage function on the storage system is eliminated.

3. The computer according to claim 1,
wherein the storage function is one of compression or de-duplication.

4. The computer according to claim 1,
wherein a storage virtualization function is used for creating the virtual logical volume on the virtual machine and associating the virtual logical volume on the virtual machine on said another computer with the logical volume in the storage system.

5. The computer according to claim 1,
wherein the controller is operable to configure a logical connection between said another computer and the storage system.

6. The computer according to claim 5,
wherein the controller is operable to configure a logical connection between said another computer as a second host computer and a first host computer which includes the initiator port, in order to form a new logical connection between the first host computer and the storage system via the second host computer; and
wherein the controller is operable to terminate a logical connection between the first host computer and the storage system that does not go through the second host computer and that was formed prior to causing the second host computer to process the storage function of the storage system.

7. The computer according to claim 1,
wherein the controller is operable to select said another computer, from a plurality of other computers, which has lowest usage of its own computer resources.

8. The computer according to claim 1,
wherein, prior to causing said another computer to process the storage function of the storage system, the controller is operable to configure multiple logical connections between a first host computer which includes the initiator port and the storage system, the multiple logical connections including a primary logical connection and a secondary logical connection; and
wherein, after causing said another computer to process the storage function of the storage system, the controller is operable to terminate the secondary logical connection between the first host computer and the storage system, configure a logical connection between said another computer and the storage system and a logical connection between said another computer and the first host computer to form a new logical connection between the first host computer and the storage system via said another computer, change the primary logical connection to a new secondary logical connection, and change the new logical connection to a new primary logical connection.

9. The computer according to claim 1,
wherein the controller is operable to specify one of a write through policy or a write back policy for write operation in said another computer with respect to sending the data to the logical volume in the storage system.

10. A system comprising:
a storage system including a logical volume and a target port; and
a first computer including a memory and a controller;
wherein the controller is operable to manage a relationship among port information of an initiator port, information of the logical volume storing data from the initiator port, and port information of the target port to be used for storing data from the initiator port to the logical volume, and to cause a second computer to process a storage function of the storage system by creating a virtual machine for executing the storage function on the second computer and by creating a virtual logical volume on the virtual machine and associating the virtual logical volume on the virtual machine on the second computer with the logical volume in the storage system, the second computer sending the data to the logical volume of the storage system after executing the storage function.

11. The system according to claim 10,
wherein by executing the storage function on the second computer, the workload of executing the storage function on the storage system is eliminated.

12. The system according to claim 10, wherein a storage virtualization function is used for creating the virtual logical volume on the virtual machine and associating the virtual logical volume on the virtual machine on the second computer with the logical volume in the storage system.

13. The system according to claim 10,
wherein the controller is operable to configure a logical connection between the second computer and the storage system and a logical connection between the second computer and a third computer which includes the initiator port, in order to form a new logical connection between the third computer and the storage system via the second computer; and
wherein the controller is operable to terminate a logical connection between the third computer and the storage system that does not go through the second computer and that was formed prior to causing the second computer to process the storage function of the storage system.

14. The system according to claim 10,
wherein, prior to causing the second computer to process the storage function of the storage system, the controller is operable to configure multiple logical connections between a third computer which includes the initiator port and the storage system, the multiple logical connections including a primary logical connection and a secondary logical connection; and
wherein, after causing the second computer to process the storage function of the storage system, the controller is operable to terminate the secondary logical connection between the third computer and the storage system, configure a logical connection between the second computer and the storage system and a logical connection between the second computer and the third computer to form a new logical connection between the third computer and the storage system via the second computer, change the primary logical connection to a new secondary logical connection, and change the new logical connection to a new primary logical connection.

15. A non-transitory computer-readable storage medium storing a plurality of instructions for controlling a data processor to manage data storage, the plurality of instructions comprising:
instructions that cause the data processor to manage a relationship among port information of an initiator port, information of a logical volume storing data from the initiator port, and port information of a target port to be used for storing data from the initiator port to the logical volume; and
instructions that cause the data processor to cause another computer to process a storage function of a storage system including the logical volume and the target port by creating a virtual machine for executing the storage function on said another computer and by creating a virtual logical volume on the virtual machine and associating the virtual logical volume on the virtual machine on said another computer with the logical volume in the storage system, said another computer sending the data to the logical volume of the storage system after executing the storage function.

16. The non-transitory computer-readable storage medium according to claim 15,
wherein by executing the storage function on said another computer, the workload of executing the storage function on the storage system is eliminated.

17. The non-transitory computer-readable storage medium according to claim 15,
wherein a storage virtualization function is used to create the virtual logical volume on the virtual machine and associate the virtual logical volume on the virtual machine on said another computer with the logical volume in the storage system.

18. The non-transitory computer-readable storage medium according to claim 15, wherein the plurality of instructions further comprise:
instructions that cause the data processor to configure a logical connection between said another computer and the storage system;
instructions that cause the data processor to configure a logical connection between said another computer as a second host computer and a first host computer which includes the initiator port, in order to form a new logical connection between the first host computer and the storage system via the second host computer; and
instructions that cause the data processor to terminate a logical connection between the first host computer and the storage system that does not go through the second host computer and that was formed prior to causing the second host computer to process the storage function of the storage system.

19. The non-transitory computer-readable storage medium according to claim 15, wherein the plurality of instructions further comprise:
   instructions that cause the data processor to select said another computer, from a plurality of other computers, which has lowest usage of its own computer resources.

20. The non-transitory computer-readable storage medium according to claim 15, wherein the plurality of instructions further comprise:
   instructions that cause the data processor, prior to causing said another computer to process the storage function of the storage system, to configure multiple logical connections between a first host computer which includes the initiator port and the storage system, the multiple logical connections including a primary logical connection and a secondary logical connection; and
   instructions that cause the data processor, after causing said another computer to process the storage function of the storage system, to terminate the secondary logical connection between the first host computer and the storage system, configure a logical connection between said another computer and the storage system and a logical connection between said another computer and the first host computer to form a new logical connection between the first host computer and the storage system via said another computer, change the primary logical connection to a new secondary logical connection, and change the new logical connection to a new primary logical connection.

* * * * *